US006665679B2

(12) United States Patent
Curtis et al.

(10) Patent No.: US 6,665,679 B2
(45) Date of Patent: Dec. 16, 2003

(54) METHOD AND SYSTEM FOR SYMBOLICAL LINKAGE AND INTELLIGENT CATEGORIZATION OF INFORMATION

(75) Inventors: Kevin Curtis, Ringoes, NJ (US); Yuri Urazov, Forest Hills, NY (US); Michael Berganovsky, River Edge, NJ (US); Alex Rosen, Brooklyn, NY (US)

(73) Assignee: Multex.com, Inc., New York, NY (US)

( * ) Notice: Subject to any disclaimer, the term of this patent is extended or adjusted under 35 U.S.C. 154(b) by 423 days.

(21) Appl. No.: 09/766,293

(22) Filed: Jan. 19, 2001

(65) Prior Publication Data

US 2001/0021922 A1 Sep. 13, 2001

Related U.S. Application Data

(63) Continuation-in-part of application No. 09/336,031, filed on Jun. 18, 1999.

(51) Int. Cl.[7] .............................................. G06F 17/30
(52) U.S. Cl. ........................ 707/100; 707/104; 707/6
(58) Field of Search .............................. 707/100, 102, 707/104, 3, 5, 6, 10, 516; 705/36, 37

(56) References Cited

U.S. PATENT DOCUMENTS

| 5,611,059 A | 3/1997 | Benton et al. |
| 5,623,679 A | 4/1997 | Rivette et al. ............... 715/526 |
| 5,706,455 A | 1/1998 | Benton et al. |
| 5,748,953 A * | 5/1998 | Mizutani et al. ................ 707/6 |
| 5,864,871 A | 1/1999 | Kitain et al. ................ 707/104 |
| 5,929,855 A | 7/1999 | Benton et al. |
| 5,940,843 A | 8/1999 | Zucknovich et al. ........ 707/516 |
| 6,055,538 A | 4/2000 | Kessenich et al. |
| 6,122,635 A | 9/2000 | Burakoff et al. ............. 707/102 |
| 6,134,535 A | 10/2000 | Belzberg ...................... 705/37 |
| 6,236,980 B1 | 5/2001 | Reese ........................... 705/36 |
| 6,282,537 B1 | 8/2001 | Madnick et al. ................ 707/4 |
| 6,496,836 B1 * | 12/2002 | Ronchi et al. ........... 707/104.1 |

* cited by examiner

*Primary Examiner*—Sanjiv Shah
(74) *Attorney, Agent, or Firm*—Kenyon & Kenyon

(57) ABSTRACT

The present invention provides a method and system for the archival and retrieval of symbolically and categorically linked information preferably in the form of documents or data records. The method and system enables the archival and retrieval of information despite idiosyncratic symbol usage. A master symbol database stores a plurality of master symbols and a categorical symbol database stores a plurality of categorical symbols, wherein each master symbol and categorical symbol are formatted according to a predetermined structure. Users may archive or retrieve symbolically linked information in an information database by providing an input symbol. If necessary the system normalizes the input symbol where the input symbol may include either or both a master symbol and a categorical symbol. After the input symbol is normalized the system searches either or both the master symbol database and the categorical symbol database in order to find a matching master symbol and a matching categorical symbol. Information is then retrieved or archived base upon either or both the matching master symbol and the matching categorical symbol.

52 Claims, 17 Drawing Sheets

METHOD AND SYSTEM FOR SYMBOLICAL LINKAGE AND INTELLIGENT CATEGORIZATION OF INFORMATION

CROSS REFERENCE TO RELATED APPLICATIONS

This application is a continuation-in-part of U.S. application Ser. No. 09/336,031, filed Jun. 18, 1999.

FIELD OF THE INVENTION

The present invention relates to the area of electronic storage and retrieval of information. In particular, the present invention pertains to a method and system for referencing, storing, retrieving and intelligently categorizing symbolically linked information.

BACKGROUND INFORMATION

Many types of information are referenced and archived in everyday life using a symbolic code. Typically a symbolic code is employed by a community of users who require a consistent and convenient language to refer to a particular set of signified objects—entities in the real world signified by the symbols of the code. However, in fact, most symbolic codes are not formalized and therefore users do not employ these codes in a coordinated and consistent manner. Thus, interpretation of symbols is problematic.

For example, in the financial world, financial exchanges each use a different set of exchange (ticker) symbols to refer to companies and their securities. Although within the United States, local exchanges coordinate symbol names, in general, worldwide exchanges each use a particular symbol set and symbol structure for identifying companies and their securities. For example, both the PSE (Pacific Stock Exchange) and the NYSE (New York Stock Exchange) use the symbol 'IBM' to signify a security of IBM. However, in the United States the symbol 'T' refers to an AT&T security while in Canada 'T' refers to a security of the company Telos. In Britain the symbol 'T' may refer to the security of a different company.

Vendors of financial information such as Reuters, Bloomberg, Bridge, etc. also employ unique symbol sets and structures to refer to companies and their securities. Many vendors of financial information use a structured symbol code segmented into two portions separated by a delimiter character. For example, a vendor may use the symbol structure ROOT[delimiter character]SOURCE where the ROOT segment refers to a particular company's security and the SOURCE segment refers to a country or exchange where that security is traded. The delimiter character is typically a character such as '@' or '.'.

Because of the multiplicity of symbols sets in circulation, interpreting a symbol in order to identify a security and a company it belongs to is problematic. For example, a single vendor may use the symbol 'IBM.FR' to refer to an IBM security traded in France and 'IBM.GB' to refer to the same IBM security traded in Great Britain. In either case, both symbols IBM.GB and IBM.FR are associated with the same company IBM. However, two vendors may use the same root and source segments to refer to two different securities issued by two different companies. For example, a first vendor might use the symbol 'T.U.S.' to refer to an AT&T security traded in the United States while a second vendor might employ the symbol 'T@US' to refer to a security of a different company. On the other hand, two different vendors may use different root and source symbols to refer to the same security of a company. For example, a first vendor might use the symbol 'IBM.UK' to refer to an IBM security traded in Great Britain while a second vendor may use the symbol 'IB.EG' to refer to the same IBM security.

The need for a consistent system to reference information linked to particular companies has grown even more important as online financial research has increased. Document repositories storing financial documents are accessible to investors and researchers via public networks such as the Internet or private networks. Contributors may submit research documents related to particular companies or securities to a document repository for archival and clients (i.e., investors or researchers) of the document repository may retrieve documents related to particular companies or securities of interest.

In the archival process, contributors typically submit a document along with an input string that refers to the company or security that is the subject of the submitted document. However, because of the multiplicity of symbol sets in use, accurate archival and retrieval of documents is highly problematic. Contributors will typically submit an input string using any of the various vendor symbols and exchange symbols in circulation or possibly may use an idiosyncratic symbol unique to that contributor. Thus, identifying a company security referred to by a contributor is difficult. Similarly, clients desiring to retrieve documents regarding a particular company will submit input symbols in a variety of formats including vendor symbols, exchange symbols or an isolated root symbol, which complicates the retrieval process.

The difficulties regarding the interpretation of security symbols illustrate a general need for a consistent and unambiguous system for referencing symbolically linked information so that the information may be accurately archived and retrieved.

Furthermore, the financial documents produced by these financial companies vary in type and topic. Some financial documents may emphasize a particular subject matter such as commodities, equity reports, industry reports, portfolio/ asset strategies, derivatives, and/or foreign exchange/ currencies. A particular company may produce documents predominantly related to a certain subject matter such as fund research or commodities. It would be advantageous for documents which emphasize a common topic to be readily retrievable. The authors of various financial documents use different research methodologies in order to produce the financial document such as fundamental, technical, quantitative or strategic research techniques. The methodology used by a person may affect the style, tone and conclusion of the financial document, therefore a person reviewing the financial document may want to know this information prior to reading the financial document. Also, financial companies may have various reasons for generating a financial document such as general commentary, forecasting, news reports and/or market data. Since financial documents may cover various topical subjects, are derived by using various research techniques and are produce for various purposes all which affect content, therefore a method of document archival and retrieval based upon these various criteria would be advantageous.

SUMMARY OF THE INVENTION

The present invention provides a method and system for the reference, archival and retrieval of symbolically linked information and the intelligent categorization of the information based upon subject matter, research methodology, publication purposes and primary subject matter. A master symbol database stores a plurality of master symbols, wherein each master symbol is formatted according to a predetermined structure. Each master symbol in the master symbol database is linked to a parent identifier that identifies a unique object. A categorical symbol database stores a plurality of categorical symbols which are also formatted according to a predetermined structure. The categorical symbol is linked to a unique document identifier that enables the retrieval of a document based upon its categorical assignment. Users may archive or retrieve symbolically linked information in an information database by providing an input symbol. The input symbol is normalized and the master symbol database is searched to find a matching master symbol. The parent identifier linked to the matching master symbol is then used to retrieve or archive information in the information database. If the input symbol includes a categorical symbol, then the categorical symbol database is searched to find a matching categorical symbol which is used to categorically retrieve or archive the information in the information database.

According to one embodiment, the present invention is applied in the context of a computer based document repository in which automatic archival of documents submitted by contributors and automatic retrieval of documents requested by clients is provided based upon analysis of an input symbol. The document repository stores a database of master symbols and linked parent identifiers referencing a plurality of objects or sub-objects. The document repository also stores a database of categorical symbols that are used to intelligently categorize the documents within the database. In the archival process, the document repository electronically receives a contributor submitted document and an input symbol pertaining to an object referenced in the document. The input symbol is normalized and used to search the master symbol database to find a matching master symbol. The document is then stored in a document database so that it is linked to the parent identifier corresponding to the matching master symbol. In regard to the categorical archival, the input symbol is used to search the categorical symbol database to find a matching categorical symbol. The document is then stored in a document database where the document identifier is linked to the matching categorical symbol. If the normalized symbol is not found in the master symbol database nor is it found in the categorical symbol database, an analysis of the contributor's historical patterns is performed to attempt to resolve the indeterminacy. Clients may retrieve documents stored in the repository by electronically providing an input symbol. The input symbol is normalized and at least one client preference parameter may be used to resolve any indeterminacy in the input symbol. The normalized symbol is used to search the master symbol database in order to find a matching master symbol. The parent identifier linked to the matching master symbol is then used to retrieve documents linked to the parent identifier. The normalized symbol is also used to search the categorical symbol database in order to find a matching categorical symbol. The matching categorical symbol is then linked to the document identifier in order to retrieve documents with the appropriate categorical symbol.

DETAILED DESCRIPTION

The present invention provides a method and system for the reference, archival and retrieval of symbolically linked information and the intelligent categorization of the information based upon subject matter, research methodology and publication purposes. The embodiments described herein pertain to a computer based document repository system for referencing, archiving and retrieving documents. According to one embodiment, the document repository stores documents relating to companies traded throughout the world. However, the embodiments described herein are merely illustrative and not intended to limit the scope of the claims appended hereto. The present invention is applicable to any environment where it is necessary to archive, retrieve or reference symbolically linked information and to intelligently categorize the symbolically linked information.

Figure 1A:
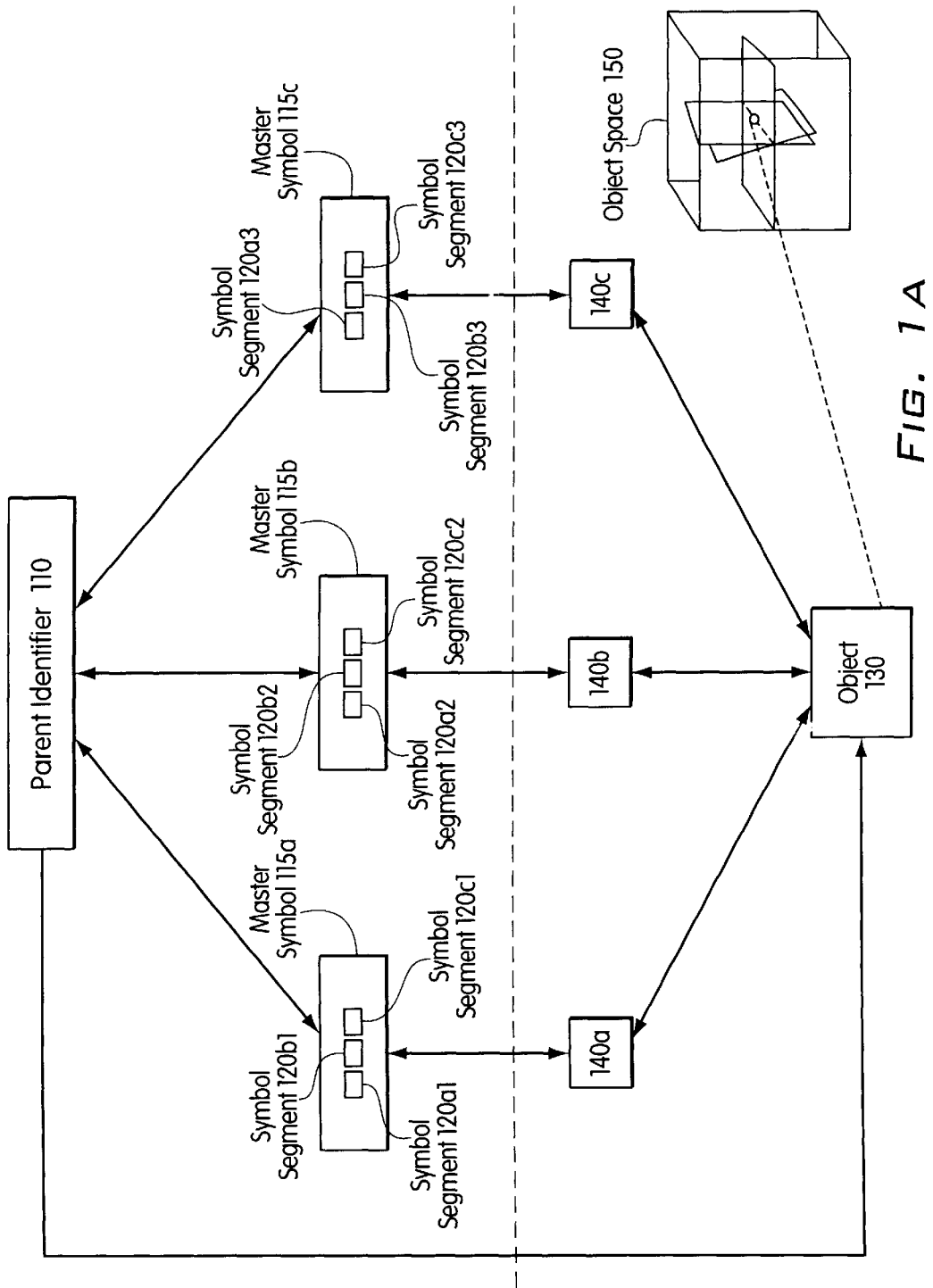
FIG. 1a depicts a relationship between a parent identifier, a number of master symbols linked to the parent identifier, an object and a number of sub-objects associated with the object according to one embodiment of the present invention.

FIG. 1*a* depicts a relationship between a parent identifier, a number of master symbols linked to the parent identifier, an object and a number of sub-objects associated with the object according to one embodiment of the present invention. The bottom portion of FIG. 1*a* shows an exemplary object 130 and a number of sub-objects 140*a*–140*b* associated with object 130. FIG. 1*a* also depicts object space 150, which consists of all possible objects. For example, according to one embodiment, object space 150 includes all companies traded throughout the world, object 130 represents a particular company and associated sub-objects (e.g., 140*a*–140*c*) represent securities issued by that company.

The top portion of FIG. 1*a* depicts the structure of a master symbol database for representing objects 130 and sub-objects 140*a*–140*c*. In particular, parent identifier 110 refers to object 130 and master symbols 115*a*–115*c* refer to sub-objects 140*a*–140*c* respectively. Note that the top and bottom portions of FIG. 1*a* are roughly symmetric. As depicted in FIG. 1*a*, each master symbol (e.g., 115*a*–115*c*) is linked to a parent identifier 110. Each parent identifier 110 in turn, refers to a unique object existing in object space 150.

The function of a master symbol database is to allow the identification of a particular object based upon an input symbol. This is indicated in FIG. 1*a* by the intersection of three planes in object space 150. As described in detail below, an input symbol is normalized and the master symbol database is searched to find a matching master symbol. The parent identifier linked to the matching master symbol is used to identify an object 130.

Figure 1B:
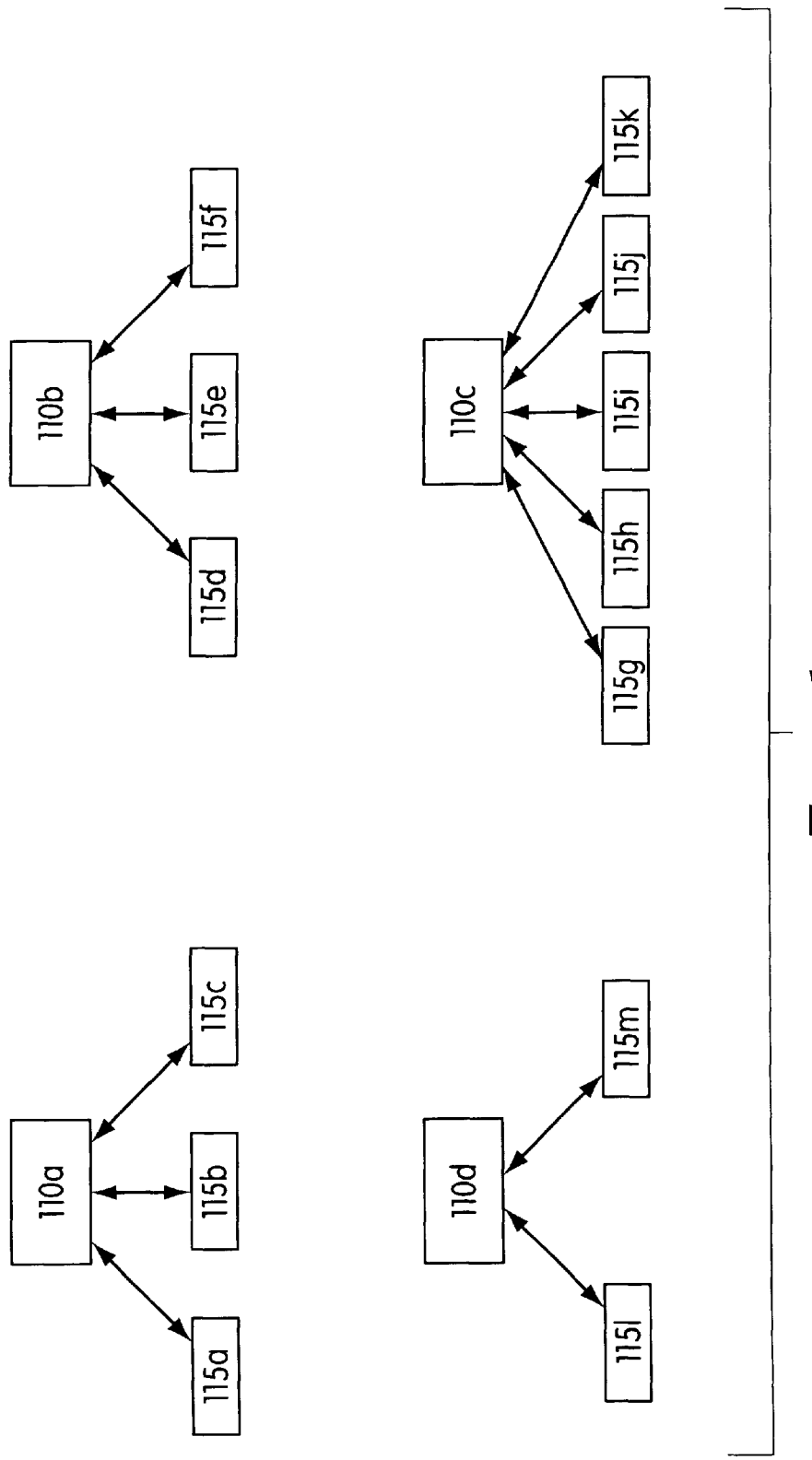
FIG. 1b shows master symbols linked to a plurality of parent identifiers according to one embodiment of the present invention.

Although FIG. 1*a* depicts a single parent identifier 110 and only three master symbols 115*a*–115*c*, a master symbol database typically will contain many master symbols, wherein each master symbol is linked to one of a plurality of parent identifiers 110. For example, FIG. 1*b* shows master symbols 115*a*–115*c* linked to parent identifier 110*a*, master symbols 115*d*–115*f* linked to parent identifier 110*b*, master symbols 11*fg*–115*k* linked to parent identifier 110*c* and master symbols 115*l*–115*m* linked to parent identifier 110*d*. Thus, master symbols 115*a*–115*c* are associated with a first object, master symbols 115*d*–115*f* are associated with a second object, master symbols 115*f*–115*k* are associated with a third object and master symbols 115*l*–115*m* are associated with a fourth object.

An example will further illustrate the application of the scheme depicted in FIG. 1*a*. According to one embodiment, each object 130 represents a company and each sub-object (e.g., 140*a*–140*c*) represents a particular security issued by that company. According to this example, a unique parent identifier 110 is assigned to each company. Each security issued by a particular company is assigned a unique master symbol, which is linked to the parent identifier 110 assigned to the company that issues the security. Each master symbol is stored in the master symbol database along with the linked parent identifier 110.

Figure 1C:
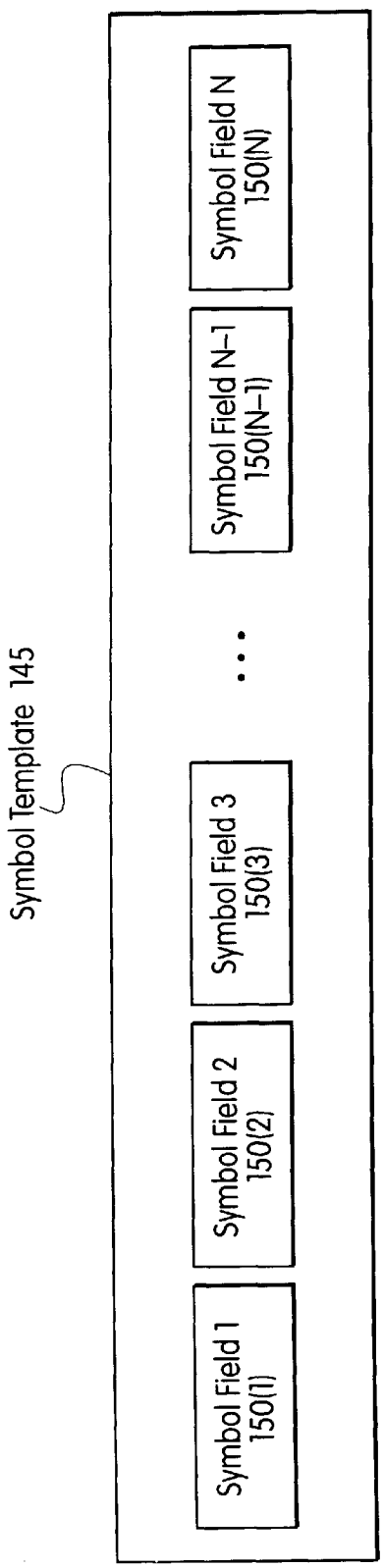
FIG. 1c depicts a symbol template according to one embodiment of the present invention.

According to one embodiment, all master symbols stored in a master symbol database utilize a pre-defined structure, which is defined by a symbol template. FIG. 1*c* depicts a symbol template according to one embodiment of the present invention. Symbol template 145 consists of an arbitrary number of symbol fields 150(1)–150(N). Each symbol field 150(1)–150(N) represents an information category and corresponds to a particular attribute of the symbolized objects or sub-objects. Thus, all master symbols stored in a master symbol database will be structured according to the same pre-determined symbol template 145.

In particular, each master symbol stored in a master symbol database will contain a master symbol segment corresponding to a portion of the symbol fields 150(1)–150(N) defined by the symbol template 145. Each symbol segment comprises a text string. For example, for a symbol field pertaining to a country attribute, symbols stored in a master symbol database may include the symbol segments (i.e., text strings) 'US', 'GB' and 'FR' to refer to the United States, Great Britain and France respectively. For example, FIG. 1*a* shows master symbols 115*a*–115*c* structured according to a symbol template 145 containing three symbol fields (not shown). This is evident from the fact that each master symbol 115*a*–115*c* is comprised of three symbol segments (i.e., 120*a*1–120*c*1, 120*a*2–120*c*2 and 120*c*1–120*c*3), corresponding respectively to the symbol fields defined by the symbol template.

An example will further illustrate the relationship of a symbol template 145 to the corresponding symbol segments forming the structure of a symbol stored in a master symbol database. According to one embodiment, master symbols stored in the master symbol database symbolize company securities traded in a particular market. In this case, a symbol template 145 such as that shown in FIG. 1*d* may be used. The first symbol field 150*a*, referred to as a root field, specifies a security of a company and the second symbol field 150*b*, referred to as a source field, specifies a country where that security is traded. Thus, in this case all symbols stored in the master symbol database will contain two symbol segments, a root segment (i.e., an ASCII string corresponding to a company security name) and a source segment (i.e., an ASCII string corresponding to a country where the security is traded), corresponding respectively to symbol fields 150*a* and 150*b* defined by symbol template 145 shown in FIG. 1*d*.

Figure 1D:
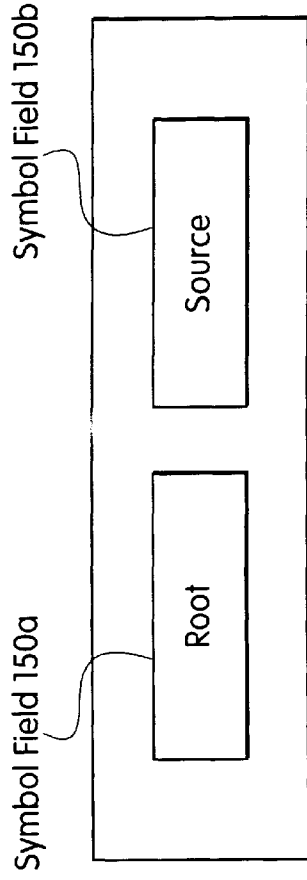
FIG. 1d depicts a particular example of a symbol template according to one embodiment of the present invention.
Figure 1E:
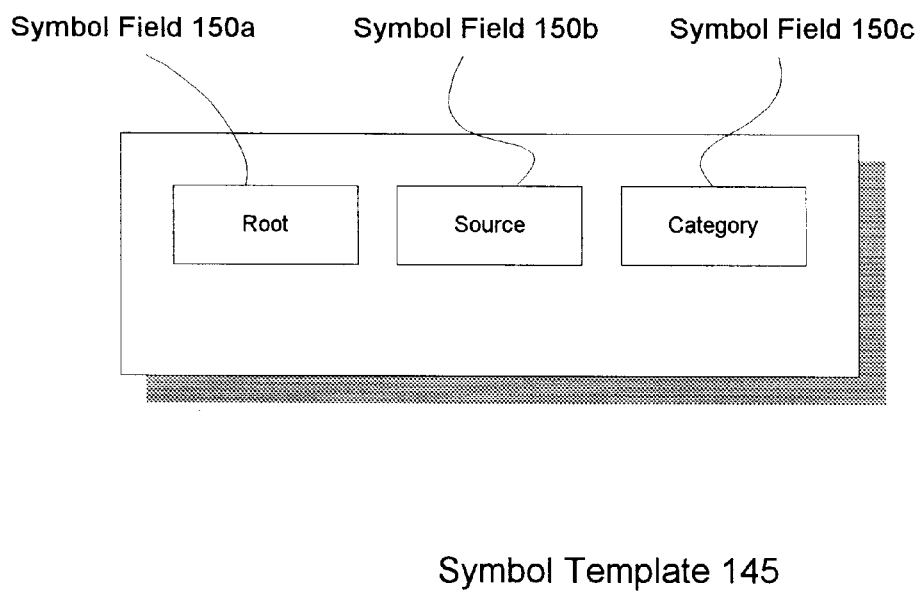
FIG. 1e depicts another a particular example of a symbol template according to one embodiment of the present invention.

Another exemplary embodiment of the symbol template 145 is shown in FIG. 1*e*, which enables the intelligent categorization of the symbolically linked information. As shown in FIG. 1*d*, the first symbol field 150*a* is referred to as the root field which specifies a security of a company and the second symbol field 150*b* is referred to as the source field which specifies a country where that security is traded. FIG.

1e includes a third symbol field 150c which is referred to as the categorical symbol field which identifies the proper category to be linked and stored in the categorical symbol database. The symbol field 150c allows the archival and retrieval of symbolically linked information based on categorical segments found in the categorized symbol database.

Master symbols stored in a master symbol database are stored in a normalized format to provide a consistent method for referencing and searching the master symbol database. Similarly, categorical symbols are stored in a categorical symbol database are also stored in a normalized format to provide a consistent method for referencing and searching the categorical symbol database. Thus, for example, the symbol segment 'US' may be used for all master symbols stored in a master symbol database to refer to the United States. Also, the symbol segment "CR" may be used as a categorical symbol stored in the categorical symbol database in order to create a category of commodity research related information.

Although FIG. 1a depicts an example in which the master symbols stored in the master symbol database refer to sub-objects 140a–140c, in an alternative embodiment the master symbols 140a–140c refer to object 130 itself. The structure of a master symbol database and a process for linking symbols to a parent identifier is described in more detail below.

Figure 2:
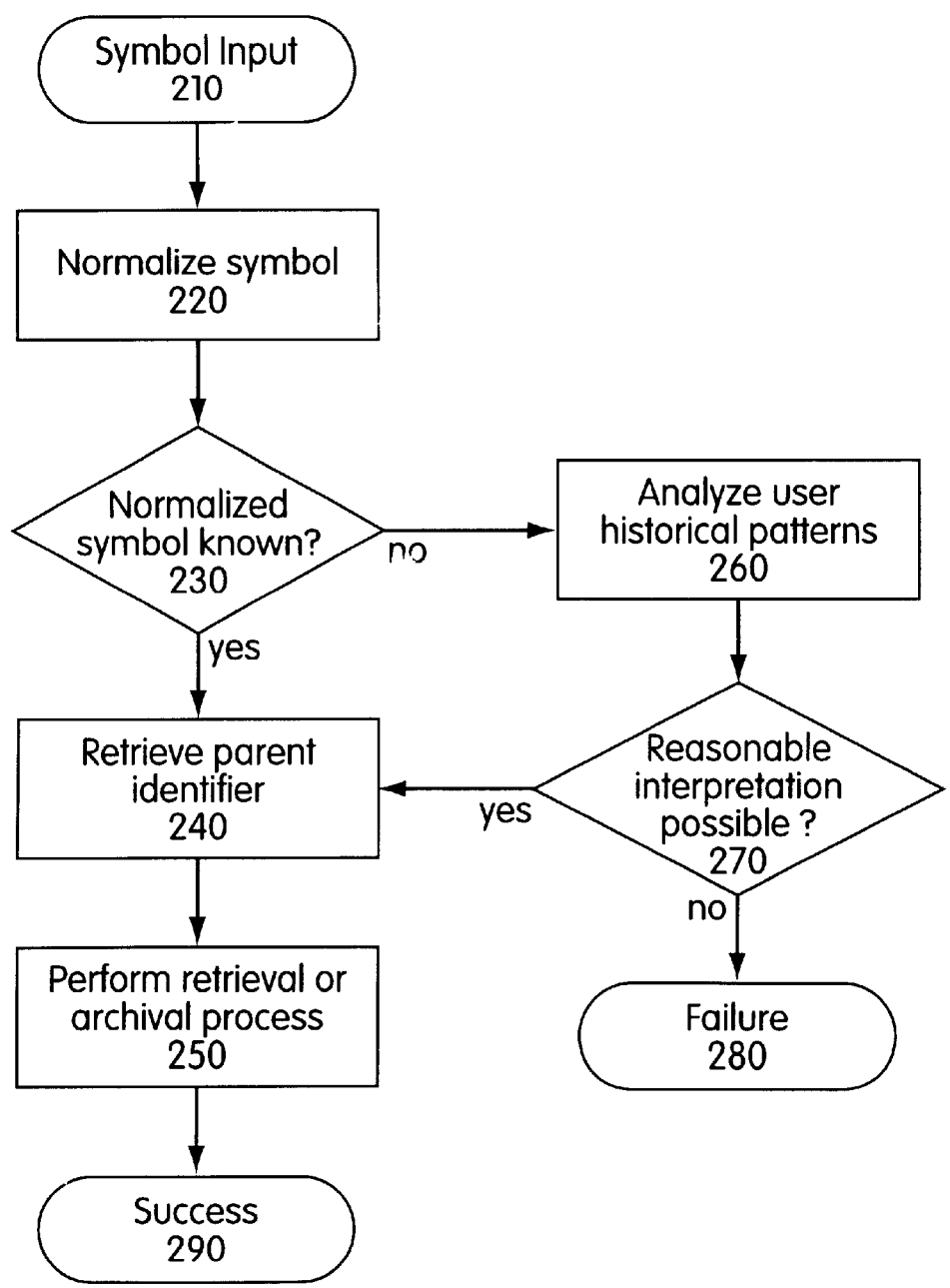
FIG. 2 is a flowchart depicting a set of steps for interpreting an input symbol in order to identify a unique associated object and any categorical symbol within the input symbol according to one embodiment of the present invention.

Users of a document repository may submit an input symbol to be searched against a master symbol database in order to either store or retrieve information associated with the input symbol. However, because symbol usage is idiosyncratic, an input symbol must be normalized and interpreted so that an object 130 it is associated with can be identified. FIG. 2 is a flowchart depicting a set of steps for interpreting an input symbol in order to identify a unique associated object according to one embodiment of the present invention. In step 210, an input symbol is received from a user. In step 220, the input symbol is processed to obtain a normalized symbol according to a set of normalization rules. A procedure for the normalization of input symbols is described in more detail below. In step 230, it is determined whether the normalized symbol is known (i.e., it can be matched to a master symbol stored in a master symbol database). If the normalized symbol is known, the parent identifier 110 linked to the normalized symbol is retrieved. Then, in step 250, using the retrieved parent identifier 110, appropriate processing such as retrieval or archival of information (for example, an electronic document) is performed. In addition to identifying the parent identifier, the symbol input may include a categorical symbol, step 225. If a categorical symbol is included in the symbol input, then performance of the appropriate categorical retrieval or archival process is performed, step 235 and the input symbol identification is complete. The procedure ends in step 290.

If the normalized symbol 115 is not known, i.e., it cannot be matched to a master symbol stored in a master symbol database ('no' branch of step 230), an analysis of historical patterns of the submitter of the symbol is performed in step 260. As discussed in more detail below, this may involve searching a separate database to determine whether the unknown input symbol was ever used before by the user and how it was interpreted. Or, in the alternative, if a particular symbol segment cannot be resolved, statistical analysis of the user's history may be performed to determine the frequency of occurrence for any unresolved symbol segments. If it is possible to resolve the symbol using historical patterns of the contributor of the symbol, the symbol is resolved ('yes' branch of step 270) and flow continues with the retrieval of the parent identifier 110 linked to the normalized symbol (step 240). If not ('no' branch of step 270), the procedure fails (step 280). Also, user historic categorical pattern data may be used to achieve the categorical retrieval or archival process. If no categorical symbols are included in the symbol input, then the user's historical categorical patterns may be analyzed in order to properly perform a categorical retrieval or archive. If a reasonable interpretation of the user categorical historical patterns is possible then the categorical retrieval or archival process is completed in step 235, otherwise the categorical retrieval or archive fails, step 280.

Figure 3:
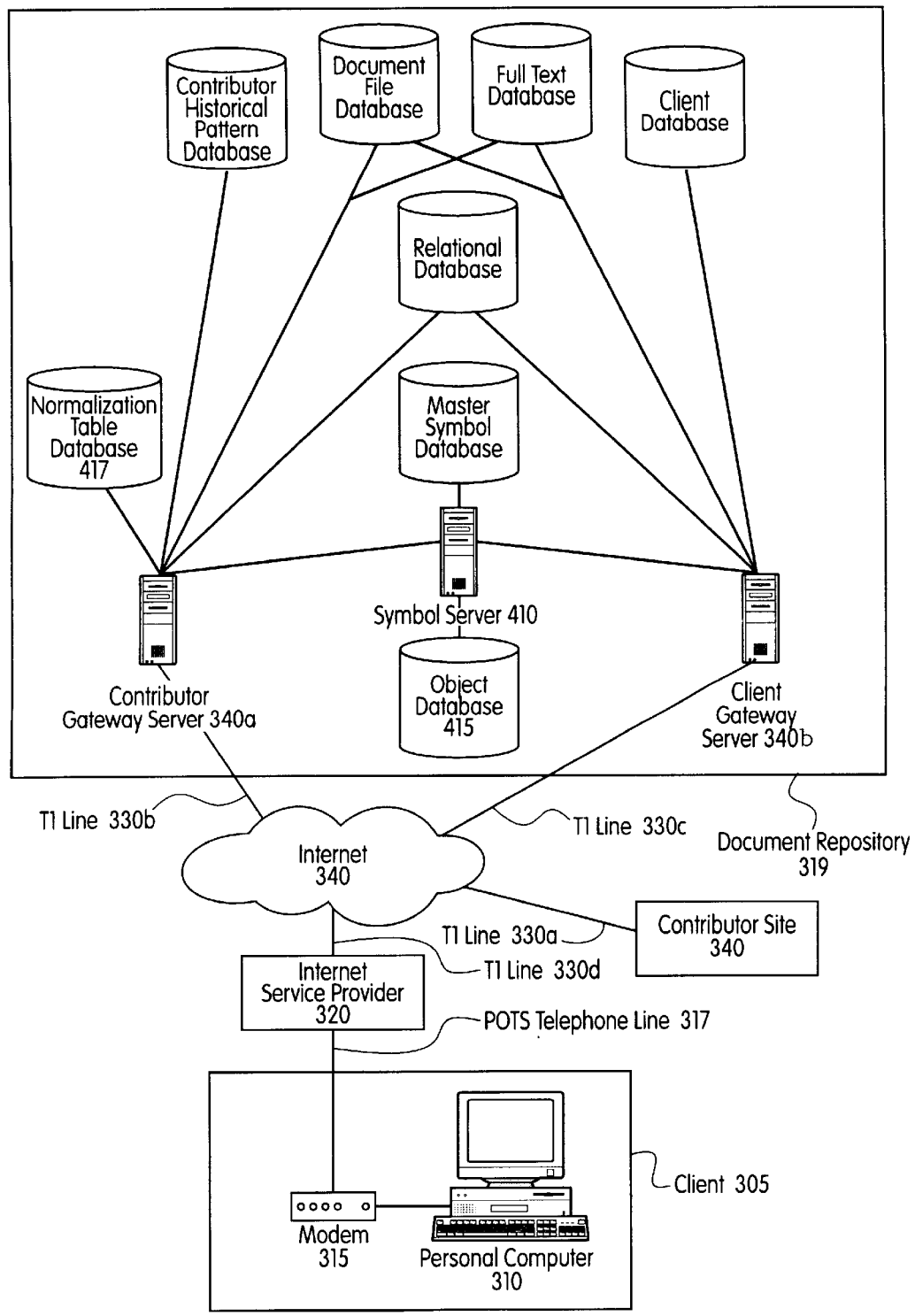
FIG. 3 is a block diagram depicting a network architecture that allows the electronic archival and retrieval of symbolically linked documents according to one embodiment of the present invention.

FIG. 3 is a block diagram depicting a network architecture that allows the electronic archival and retrieval of symbolically linked documents according to one embodiment of the present invention. Document repository 319 contains, among other components, contributor gateway server 340a and client gateway server 340b. Servers 340a and 340b each include a processor and memory for executing program instructions as well as a network interface (not shown).

According to one embodiment, client 305 uses personal computer 310 running browser software (not shown) to communicate with document repository 319 via modem 315, POTS telephone line 317, Internet service provider 320, T1 line 330d, Internet 340, T1 line 330c and client gateway server 340b. Client 305 may search for particular data or documents stored at document repository 319 by submitting an input symbol relating to a desired object or sub-object. Client gateway server 340b runs a number of processes (described in more detail below) for performing search and retrieval of documents from document repository 319. In particular, client gateway server 340b runs a number of processes for receiving an input symbol from a client 305, normalizing the input symbol, searching the master symbol database 420 to find a corresponding parent identifier (if it exists), and retrieving documents from document database linked to that parent identifier. Also, the client gateway server 340b may search the document repository 319 in order to retrieve or archive documents based upon a categorical symbol that may be a portion of the input symbol. The documents which have been assigned, by a user or using the historical pattern associated with the user, a categorical symbol may be retrieved or archived based upon the categorical symbol. The categorical symbols associated with the documents are stored in the categorical symbol database 425, and are linked to the document file database 450 via the contributor gateway server 340a and the client gateway server 340b.

Client gateway server 340b also runs a process to provide a GUI (Graphical User Interface) that provides a convenient interface for clients 305 to submit input symbols for searching document repository 319 for specific documents and for displaying retrieved documents to the client. According to one embodiment client gateway server 340b serves HTML (Hypertext Markup Language) content located on a storage device (not shown) to clients (e.g., 305) connecting to client gateway server 340b. In particular, HTML pages stored on client gateway server 340b provide a convenient user interface that allows clients to enter input strings to search document repository 319 for documents relating to a particular object symbolized by an input symbol. Also, clients may search the document repository 319 for documents grouped into particular categories based upon categorical symbols within the input symbol. The categorical search may include a search for a particular type of document, i.e. commodity research, derivative research, and industry reports, associated with a particular company or perhaps published in a particular country. Another exemplary embodiment of the GUI may provide a convenient interface for clients to include a categorical identifier for the input symbol. In addition, client gateway server 340b may run at least one CGI (Common Gateway Interface) script that allows entry and processing of input search strings provided by clients.

Contributor 340 communicates with document repository 319 via T1 line 330a, Internet 340, T1 line 330b and contributor gateway server 340b. Documents generated at contributor site 340 may be transmitted to document repository 319 via T1 line 330b, Internet 340 and contributor gateway server 340a. Contributor gateway server 340a runs a number of processes (described in detail below) related to receiving documents and input symbols from contributors, normalizing received input symbols, searching master symbol database 420 and/or categorical symbol database 425, and archiving documents submitted by various contributors. Contributor 340 may submit documents to document repository 319 electronically over Internet 340 in any number of formats including text files, PDF (Portable Document Files), Microsoft Word files, etc. The remaining components contained within document repository 319 are discussed below with reference to FIG. 4.

Figure 4:
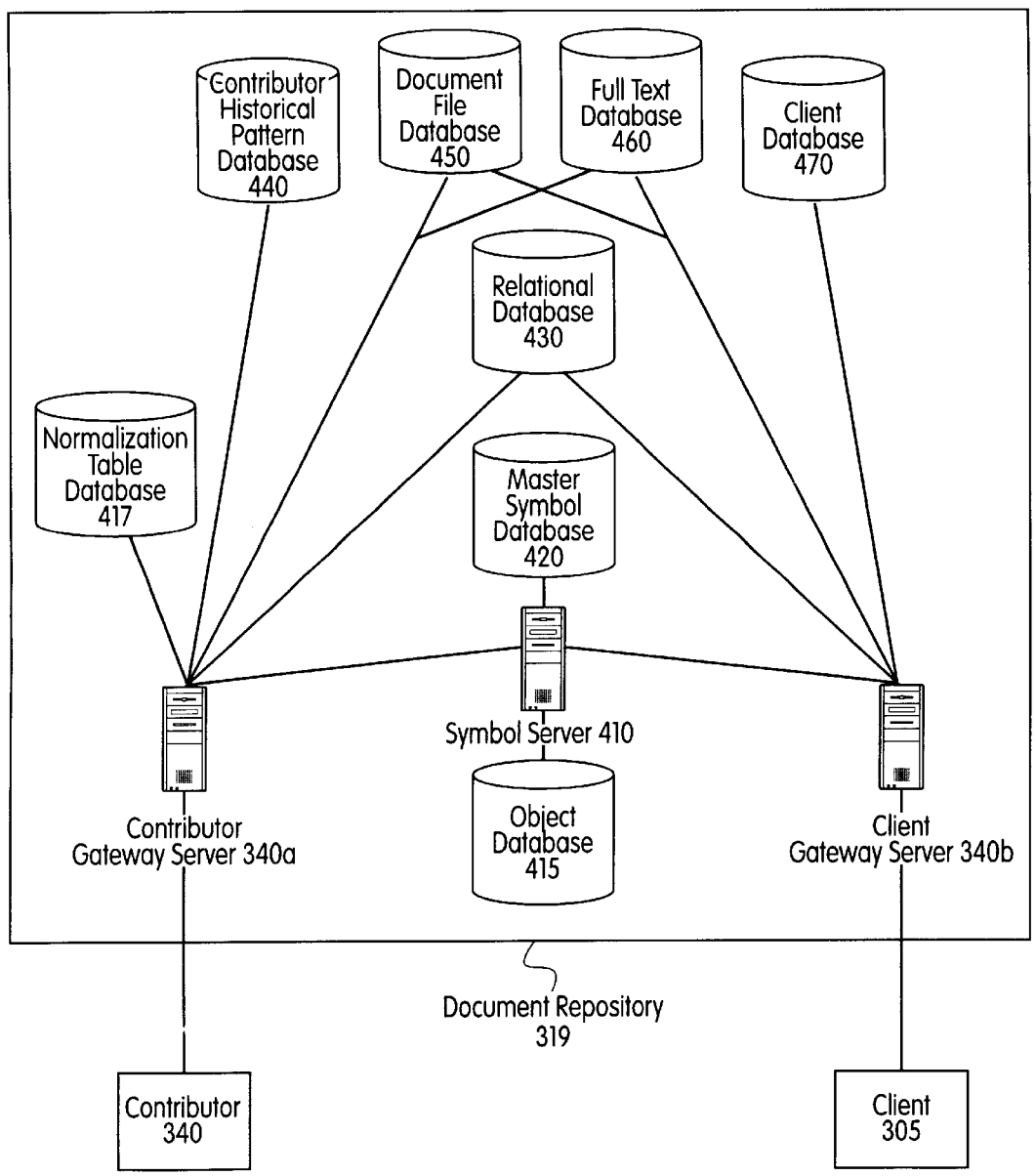
FIG. 4 is a block diagram depicting the architecture of a portion of a document repository system for archiving and retrieving symbolically linked documents according to one embodiment of the present invention.

FIG. 4 is a block diagram depicting the architecture of a portion of a document repository system for archiving and retrieving symbolically linked documents according to one embodiment of the present invention. Document repository 319 contains contributor gateway server 340a, client gateway server 340b, symbol server 410, master symbol database 420, categorical symbol database 425, relational database 430, contributor historical pattern database 440, document file database 450, full text database 460, client database 470, normalization table database 417 and object database 415. Although only one contributor 340 and one client 305 are depicted in FIG. 4, the system is designed to function with multiple contributors and clients.

Symbol server 410 receives and processes requests from contributor gateway server 340a and client gateway server 340b to search the master symbol database 420 and/or the categorical symbol database 425. In particular, as described in more detail below, symbol server 410 runs a process to receive at least one normalized input symbol from either contributor gateway server 340a or client gateway server 340b and return a corresponding parent identifier 110 retrieved from symbol database 420 if a master symbol matching the normalized input symbol is found in master symbol database 420. The symbol server 410 may also return a corresponding categorical symbol retrieved from the categorical symbol database 425 if the request includes a search of the categorical symbol database 425 for a categorical symbol that is included within the normalized input symbol.

Master symbol database 420 stores a list of all master symbols (e.g., 115a–115c) and their associated parent identifiers 110. For example, according to one embodiment, master symbol database 420 stores a set of master symbols pertaining to securities issued by companies throughout the world. According to one embodiment, master symbol database 420 is generated on a periodic basis from a set of source tables that reference all known securities of companies traded throughout the world. The creation of master symbol database 420 is described in more detail below. The categorical symbol database 425 stores a list of all categorical symbols used to categorized the symbolically linked information. According to one embodiment, categorical symbols may be assigned to a plurality of: report emphasis areas, i.e., commodity research, company reports, convertible research, credit research; research methodologies, i.e., fundamental, technical, quantitative or strategic; report objectives, i.e., commentary, forecast news, market data; and primary subject matters.

Figure 5A:
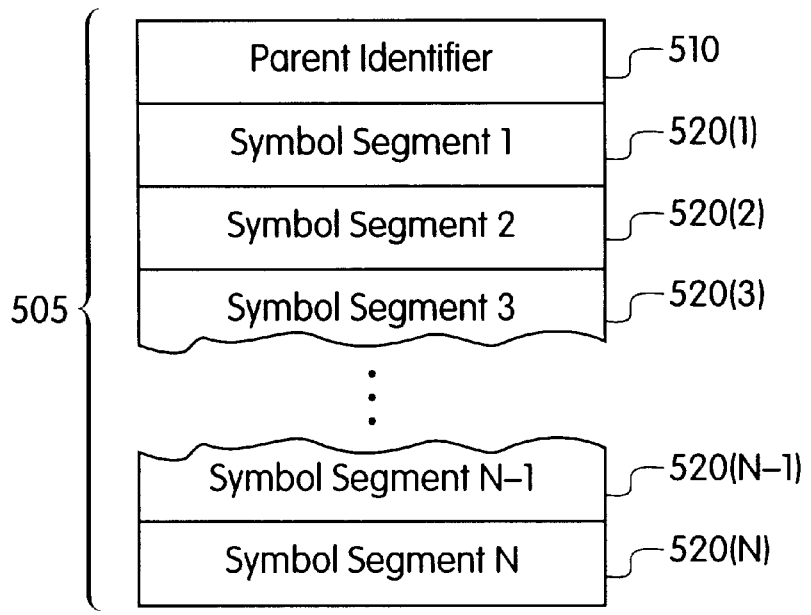
FIG. 5a depicts a data structure for storage of master symbol data in a master symbol database according to one embodiment of the present invention.

FIG. 5a depicts a data structure for storage of master symbol data in a master symbol database according to one embodiment of the present invention. In particular, FIG. 5a is a data structure for storing and linking a parent identifier 110 with a master symbol (e.g., 115a–115c) structured according to an arbitrary number (N) of symbol segments (e.g., 120a1–120c3). Master symbol database 420 stores one record 505 for each master symbol in the database 420. Each record 505 consists of parent identifier field 510 and symbol segment fields 520(1)–520(N). The number of symbol segment fields will vary depending upon the symbol template 145 defining the structure of master symbols stored in master symbol database 420 (i.e., the number of symbol segments will correspond precisely to the number of symbol fields comprising each symbol). Parent identifier field 510 and symbol segment fields 520(1)–520(N) are comprised of one or more memory locations for storing information on a storage device such as hard disk drive. For example, according to one embodiment, parent identifier field 510 stores a 32-bit integer value occupying 4 bytes of information. Symbol segment fields 520(1)–520(N) store ASCII text strings of a predetermined length.

Figure 5B:
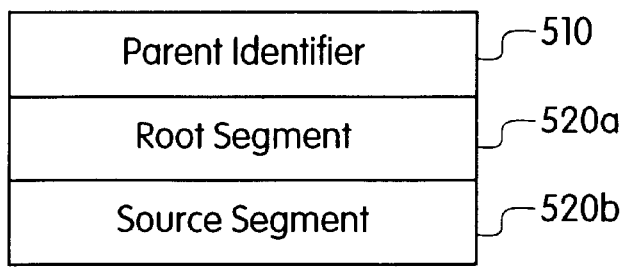
FIG. 5b depicts a particular example of the data structure shown in FIG. 5a applied in the context of storage of company security symbols traded throughout the world according to one embodiment of the present invention.

For example, FIG. 5b depicts a particular example of the data structure shown in FIG. 5a applied in the context of storage of company security symbols traded throughout the world according to one embodiment of the present invention. According to this embodiment, a record 505 containing three fields 510, 520a and 520b is generated for each security symbol. Fields 520a and 520b store a root symbol segment corresponding to the name of a company security and a source symbol segment corresponding to a country where that security is traded, respectively. Field 510 stores a parent identifier associated with the master security symbol, i.e., the parent identifier assigned to the company issuing the security. The creation of master symbol database 420 is described in detail below.

Figure 6:
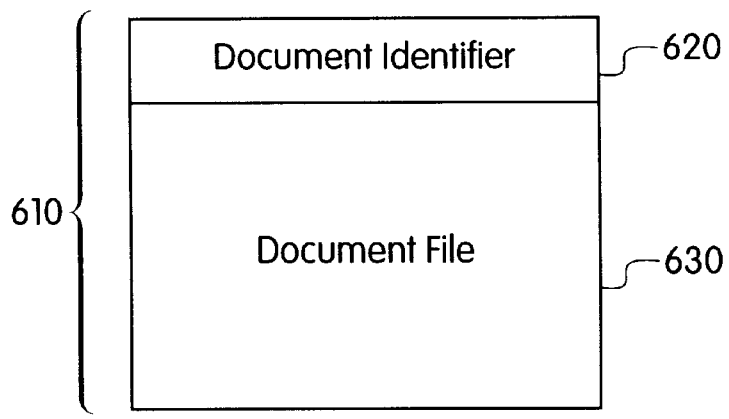
FIG. 6 depicts a data structure for the storage of documents in a document file database according to one embodiment of the present invention.

FIG. 6 depicts a data structure for the storage of documents in a document file database according to one embodiment of the present invention. Document file database 450 stores one record 610 for each document stored in the database. Each record 610 is comprised of document file field 630 and document identifier field 620. Document file field 630 stores the actual formatted document data of a document. Alternatively document file field 630 may store a pointer that points to a memory location where document data is stored. Document identifier field 620 stores a unique identification code that is assigned to each document stored in document file database 450. As described below, upon receipt of a document at document repository 319, a unique document identifier is generated for the received document and stored with the document in document identifier field 620. Documents may be stored in any number of file formats. For example, documents may be stored as PDF files, Microsoft Word Files, text files, etc.

Full text database 460 stores document data in a text format that allows searching document data for particular keywords. According to one embodiment, contributor gateway server 340a runs a process to perform conversion of received documents from contributors (e.g., 140) to a text format for storage in full text database 460. Full text database 460 allows searching and retrieval of documents according to particular search terms contained within the documents themselves.

Figure 7:
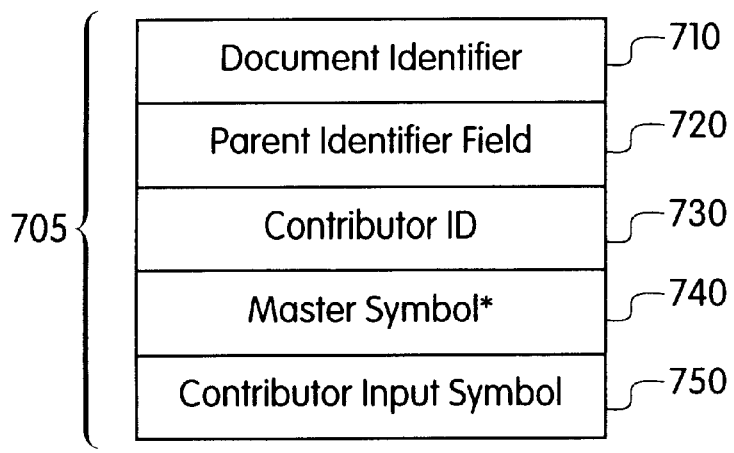
FIG. 7 depicts a data structure used in a relational database for storing information relating to documents stored at a document repository according to one embodiment of the present invention.

FIG. 7 depicts a data structure used in a relational database for storing information relating to documents stored at a document repository according to one embodiment of the present invention. Relational database 430 serves as a bridge between document file database 450 and master symbol database 420. In particular, for each document stored in document database, relational database 430 cross-references the document ID 730 of the document to the parent ID 720 corresponding to an object or sub-object referenced in the document. Also, the relational database 430 serves as a bridge between the document file database 450 and the categorical symbol database 425. Similar to the master symbol data, for each document stored in the document database the relational database 430 cross references the document ID 730 of the document to the categorical symbol corresponding to the categorical symbol referenced in the input symbol of the document. Relational database 430 also stores additional data regarding particular attributes of documents received from contributors.

A record 705 is generated in relational database 430 for each document stored at document repository 319. According to one embodiment of the present invention, each record contains document identifier field 710 parent identifier field 720 contributor ID field 730 master symbol pointer field 740, categorical symbol field pointer 745, contributor input symbol field 750 and a predetermined number of contributor element fields (not shown).

Document identifier field 710 stores a unique document identifier assigned to the document. The unique document identifier is generated upon receipt of a document at document repository 319. Parent identifier field 720 stores a parent identifier that relates to an object that is associated with the document. Typically, parent identifier field 720 stores the parent identifier linked to an input symbol submitted by the contributor of the document. As described below in detail below, as part of the archival of new documents submitted by contributors, a contributor input symbol is normalized and a parent identifier linked to a matching master symbol in the master symbol database is retrieved from master symbol database. This parent identifier is stored in parent identifier field 720. For example, according to one embodiment, in the context of archiving financial documents, parent identifier field 720 stores an identifier of a company that is associated with a document having the document identifier stored in document identifier field 710.

Contributor ID field 730 stores a unique contributor identifier corresponding to the contributor of the document. Master symbol pointer field 740 stores a pointer to a master symbol in master symbol database 420 that is associated with the object of a document. In particular, this pointer points to the matching master symbol found by searching master symbol database 420 using the normalized input symbol provided by the contributor. Categorical symbol pointer field 745 stores a pointer to a categorical symbol in the categorical symbol database 425 that is associated with the categorical symbol within the normalized input symbol submitted by the contributor. Contributor input symbol field 750 stores the input symbol provided by the contributor (prior to normalization) when submitting the document.

Figure 8:
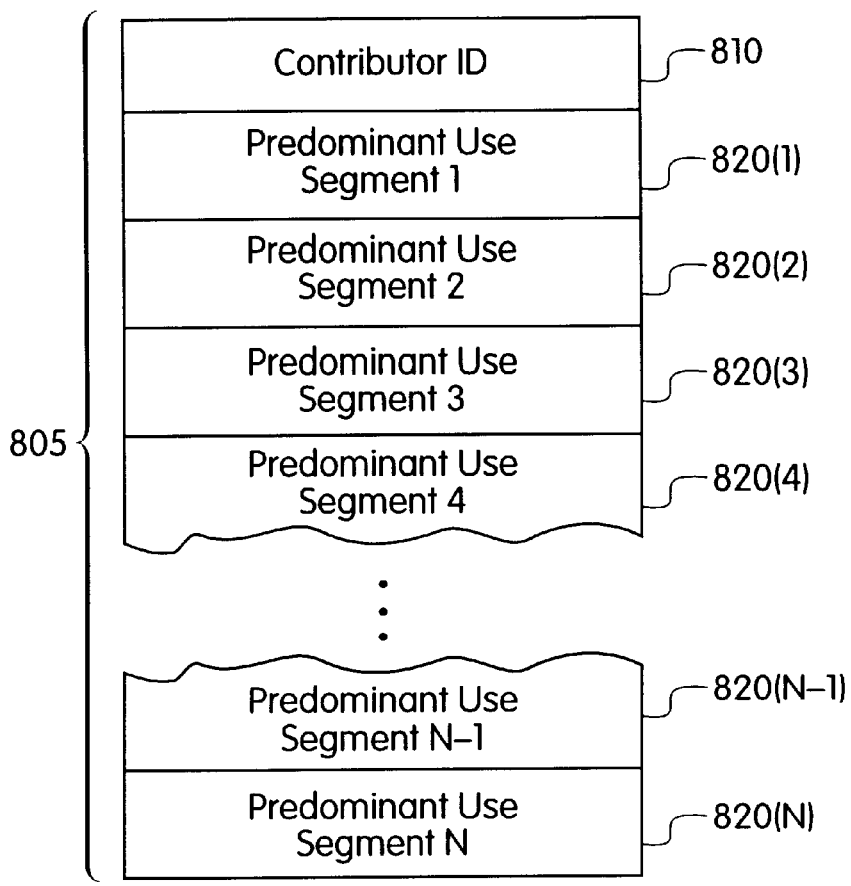
FIG. 8 depicts a data structure used in contributor historical pattern database for storing information relating to historical symbol use trends of particular contributors according to one embodiment of the present invention.

FIG. 8 depicts a data structure used in contributor historical pattern database for storing information relating to historical symbol use trends of particular contributors according to one embodiment of the present invention. The purpose of contributor historical pattern database 440 is to assist in the normalization of input symbols provided by contributors and allow resolution of ambiguous symbols provided by contributors when submitting documents to document repository 319. For example, contributors may submit an input symbol with a document that is missing one or more symbol segments. Or, a contributor may submit an input symbol containing one or more symbol segments that cannot be resolved after normalization and searching master symbol database 420.

Contributor historical pattern database 440 stores a record for each contributor providing documents to document repository 319. Each record consists of a contributor ID field 810, and a predetermined number of predominant use segment fields 820(1)–820(N). In the example embodiment of the present invention, the number of predominant use segment fields stored in each record 805 will correspond precisely to the number of symbol fields defined by the symbol template 145 for storing master symbols in master symbol database 420.

Contributor ID field 810 stores a unique contributor identifier for each contributor submitting documents to document repository 319. Predominant use segments 820(1)–820(N) correspond respectively to symbol fields 150(1)–150(N) and each store the most frequently submitted symbol segment corresponding to the respective symbol field for a contributor.

For example, in the context of a financial document repository, in which a master symbol database stores company security symbols utilizing the structure ROOT.SOURCE, contributor historical pattern database might store the following records:

Record 1
    Field 810: Contributor 1 ID
    Field 820(1): <BLANK>
    Field 820(2): GB
Record 2
    Field 810: Contributor 2 ID
    Field 820(1): <BLANK>
    Field 820(2): US
Record 3
    Field 810: Contributor 3 ID
    Field 820(1): <BLANK>
    Field 820(2): FR Records 1–3 each store predominant use segments for contributors 1–3. The first predominant symbol segment field 820(1) is blank for all contributors indicating that no predominant use segment exists for the root field of symbol template 145 shown in FIG. 1c. The second predominant symbol segment field 820(2) contains entries for contributors 1–3. In particular, record 1 shows that GB is the most predominant symbol segment submitted by contributor 1, US is the most predominant symbol segment submitted by contributor 2 and FR is the most predominant symbol segment submitted by contributor 3.

Thus, according to one embodiment, if contributor 2 were to submit an input symbol that were missing a symbol segment corresponding to source field 150b, contributor historical pattern database would be searched to determine that 'US' is the most predominantly used segment for the source field submitted by contributor 2. Thus, the symbol segment 'US' would be assigned as the source segment for the input symbol provided by the contributor.

Below shows another exemplary embodiment in the context of the financial document repository, in which a master symbol database stores company security symbols utilizing the structure of ROOT.CATEGORY, contributor historical pattern database might store the following records:

Record 4
  Field 810: Contributor 1 ID
  Field 820(1): <BLANK>
  Field 820(2): Commodity Research
Record 5
  Field 810: Contributor 2 ID
  Field 820(1): <BLANK>
  Field 820(2): Industry Reports
Record 6
  Field 810: Contributor 3 ID
  Field 820(1): <BLANK>
  Field 820(2): Company Reports Records 4–6 each store predominant use segments for contributors 1–3. The first predominant symbol segment field is again left blank indicating that no predominant use segment exists for the root field of symbol template 145 shown in FIG. 1c. The second predominant symbol segment field 820(2) shows respectively the most predominant symbol segments submitted by the contributors: Commodity Research for contributor 1; Industry Reports for contributor 2; and Company Reports for contributor 3. The generation of historical pattern database 440 is described in more detail below.

Figure 9:
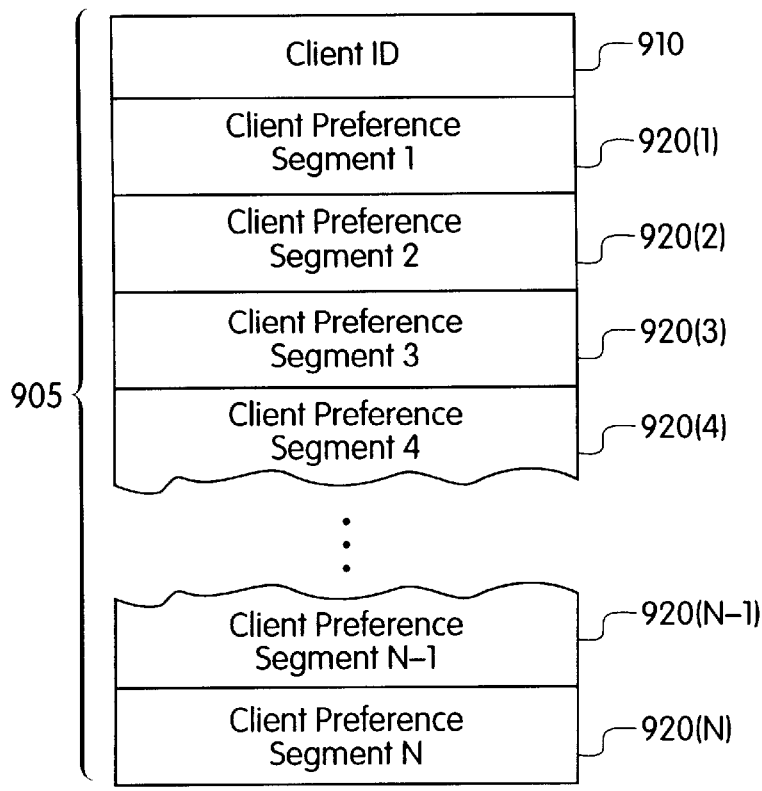
FIG. 9 depicts a data structure used in a client database for storing information relating to client preferences according to one embodiment of the present invention.

FIG. 9 depicts a data structure used in a client database for storing information relating to client preferences according to one embodiment of the present invention. Client preferences database 470 stores client preference data regarding default symbol segments in order to assist in the normalization of input symbols provided by clients. Similar to contributor historical pattern database, the purpose of client database 440 is to allow resolution of ambiguous symbols provided by clients when submitting documents to document repository 319. However, according to one embodiment, client database is not created by analyzing historical trends of clients, but rather by allowing clients to choose default symbol segment preferences in advance. For example, clients may submit an input symbol for searching document repository 319 that is missing one or more symbol segments. Or, a client may submit an input symbol containing one or more symbol segments that cannot be resolved after normalization and searching master symbol database 420.

Client historical pattern database 440 stores a record for each client using document repository 319. Each record consists of a client ID field 910, and a predetermined number of client preference segment fields 920(1)–920(N). The number of client preference segment fields stored in each record 905 will correspond precisely to the number of symbol fields defined by symbol template 145 for storing master symbols in master symbol database 420.

Client ID field 910 stores a unique client identifier for each client using document repository 319. Client preference segments 920(1)–920(N) correspond respectively to symbol fields 150(1)–150(N) in symbol template 145 and each respectively stores a client defined default preference segment corresponding to the respective symbol field for a client.

For example, in the context of a financial document repository, in which a master symbol database stores company security symbols utilizing the structure ROOT.SOURCE, client database might store the following records:

Record 1
  Field 910: Client 1 ID
  Field 920(1): <BLANK>
  Field 920(2): GB
Record 2
  Field 910: Client 2 ID
  Field 920(1): <BLANK>
  Field 920(2): US
Record 3
  Field 910: Client 3 ID
  Field 920(1): <BLANK>
  Field 920(2): FR Records 1–3 each store client preference segments for clients 1–3. The first client preference segment field 920(1) is blank for all clients indicating that no client preference segment has been established for the root field of symbol template 145 shown in FIG. 1c. The second client preference segment field 920(2) contains entries for contributors 1–3. In particular, record 1 shows that client 1–3 have selected 'US', 'GB' and 'FR' for the source field 150b respectively.

Thus, according to one embodiment, if client 2 were to submit an input symbol that were missing a symbol segment corresponding to the source field 150b, client historical pattern database would be searched to determined that 'US' is the default symbol segment selected by client 2 for the source field. Thus, the symbol segment 'US' would be assigned as the source segment for the input symbol provided by the client.

Below shows another exemplary embodiment in the context of the financial document repository, in which a master symbol database stores company security symbols utilizing the structure of ROOT.CATEGORY, contributor historical pattern database might store the following records:

Record 4
  Field 910: Client 1 ID
  Field 920(1): <BLANK>
  Field 920(2): Commodity Research
Record 5
  Field 910: Client 2 ID
  Field 920(1): <BLANK>
  Field 920(2): Industry Reports
Record 6
  Field 910: Client 3 ID
  Field 920(1): <BLANK>
  Field 920(2): Company Reports Records 4–6 each store client preference segments for clients 1–3. The first client preference symbol segment field is again left blank indicating that no client preference use segment exists for the root field of symbol template 145 shown in FIG. 1c. The second client preference symbol segment field 920(2) shows respectively the most client preference symbol segments submitted by clients 1–3: Commodity Research for client 1; Industry Reports for client 2; and Company Reports for client 3. Therefore according to this embodiment, if client 3 were to submit an input symbol that is missing a symbol segment corresponding to the categorical field 150 (2), the client historical pattern database would be searched to determine that "Company Reports" is the default symbol segment selected by client 3 for the categorical field. Accordingly, the symbol segment "Company Reports" would be assigned as the categorical segment for the input symbol.

Figure 10:
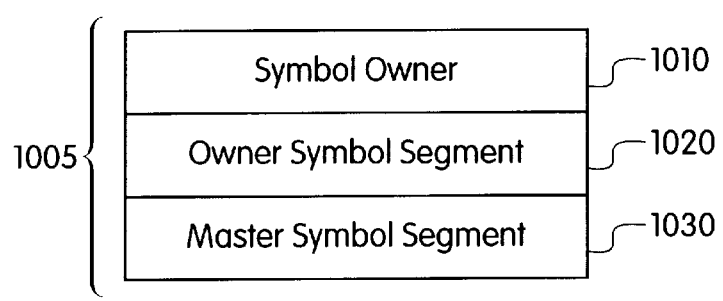
FIG. 10 depicts a data structure used in a normalization table database relating to various symbol sets according to one embodiment of the present invention.

FIG. 10 depicts a data structure used in a normalization table database relating to various symbol sets according to one embodiment of the present invention. The function of normalization table database 417 is to assist in the normalization of input symbols provided by contributors or clients. Because clients and contributors may provide input symbols using any number of symbol sets in existence, a mechanism is used to negotiate between the various symbol sets in circulation and the set of master symbols stored in master symbol database 420. For example, with respect to financial symbols, contributors and clients may submit input strings using any number of vendor symbols or exchange symbols. Normalization table database 417 allows conversion and negotiation between different symbol sets that may be in circulation.

For example, according to one embodiment, normalization table database 417 stores information relating symbol sets of various financial information vendors and exchanges to the master symbols stored in master symbol database 420. In particular, one contributor might use the symbol segment 'GB' to refer to Great Britain while another contributor might use the symbol segment 'EN'. However, master symbols stored in master symbol database 420 might use the symbol segment 'UK' to refer to Great Britain. Thus, if a client submits a symbol containing the symbol segment 'GB' it must be normalized to 'UK' so it can be searched against the master symbols stored in master symbol database 420.

According to one embodiment, normalization table database stores a record 1005 for each symbol in circulation that might be used by a contributor or client. Record 1005 includes symbol owner field 1010, owner symbol segment field 1020 and master symbol segment field 1030. Symbol owner field 1010 stores a unique identifier of an entity or organization to which a particular symbol segment in circulation belongs (e.g., an exchange or a vendor). Owner symbol segment field 1020 stores an ASCII string of the symbol segment employed by a particular symbol owner (e.g., a vendor or exchange). Master symbol segment 1030 field stores the corresponding symbol segment that would be stored in master symbol database 420. Thus, master symbol segment field 1030 stores a symbol segment corresponding to the normalization of the owner symbol segment stored in field 1020.

For example, normalization table database might contain two records as follows.

Record 1
  Field 1: GB
  Field 2: Symbol Owner 1 ID
  Field 3: EN
Record 2
  Field 1: GB
  Field 2: Symbol Owner 2 ID
  Field 3: UK In this case, record 1 indicates that symbol owner 1 uses the symbol segment 'EN' to refer to Great Britain, while symbols stored master symbol database 420 use the symbol segment 'GB' to refer to Great Britain. Record 2 indicates that symbol owner 2 uses the symbol segment 'UK' to refer to Great Britain, while symbols stored in master symbol database use the symbol segment 'GB' to refer to Great Britain. Thus, if a client or contributor provided an input symbol in a symbol format corresponding to symbol owner 2 and the input symbol contained the symbol segment 'UK', the symbol segment 'UK' would be normalized to 'GB' because this is the corresponding symbol segment used to represent Great Britain for all master symbols stored in master symbol database 420.

Figure 11:
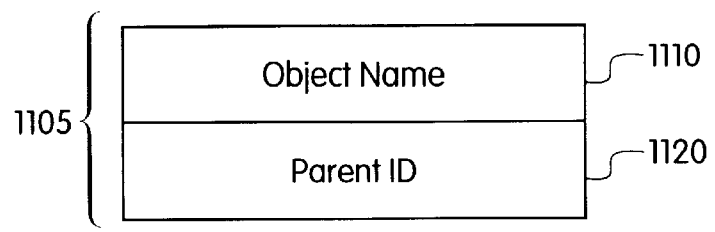
FIG. 11 depicts a data structure used in an object database for storing information relating an object to a parent identifier according to one embodiment of the present invention.

FIG. 11 depicts a data structure used in an object database for storing information relating an object to a parent identifier according to one embodiment of the present invention. A record 1105 is generated for every object in object space 105. Each record 1105 includes two fields, object name field 1110 and parent ID field 1120. Object name field 1110 stores the name of an object and parent ID field 1120 stores a unique parent identifier associated with that object. For example, according to one embodiment of the present invention, object database 415 stores information regarding companies traded throughout the world. In this case, a record 1105 is generated for each company. Object name field 1110 stores a name of a company and parent ID field 1120 stores a unique parent identifier associated with the company named in field 1110.

Figure 12:
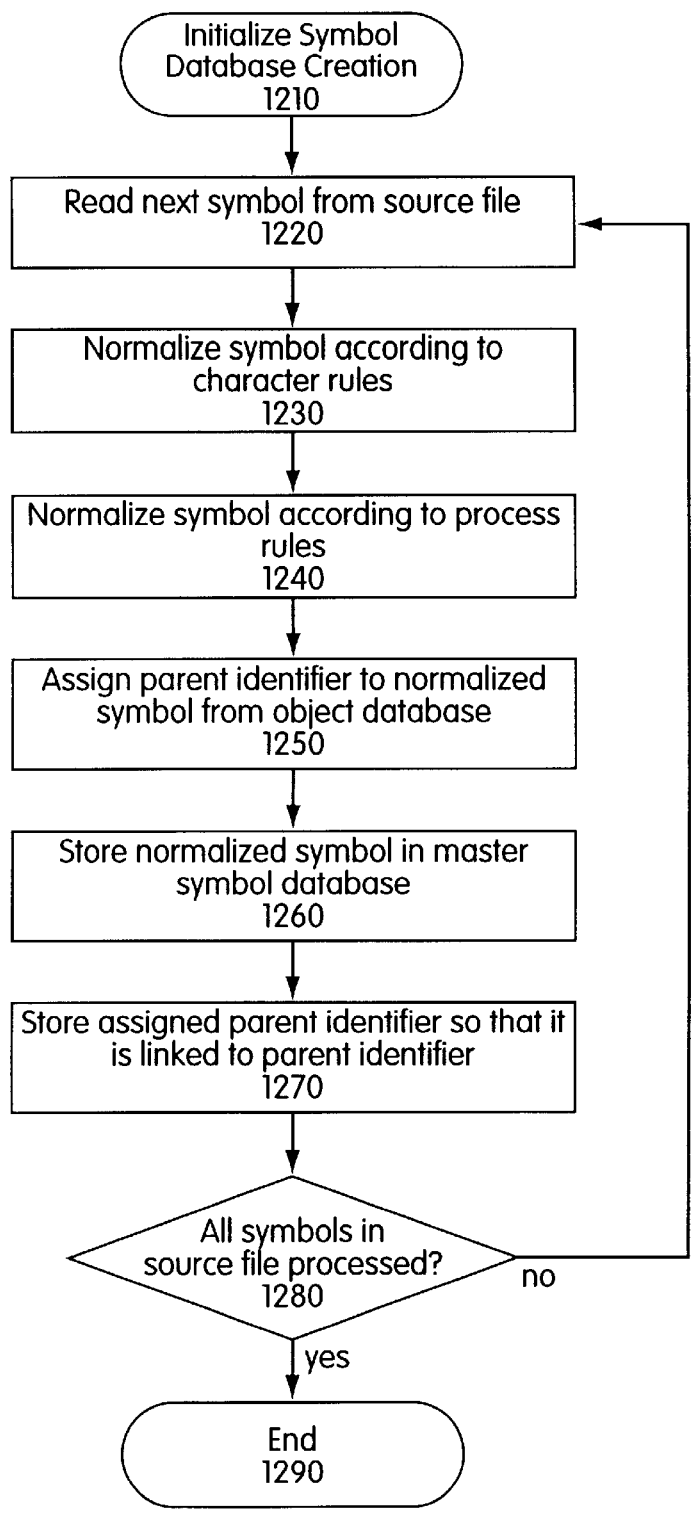
FIG. 12 is a flowchart of steps for the creation of a master symbol database according to one embodiment of the present invention.

FIG. 12 is a flowchart of steps for the creation of a master symbol database according to one embodiment of the present invention. According to one embodiment, one or more symbol source files and object database 415 are utilized in the creation of master symbol database 420. For example, in the context of building a master symbol database of company securities, a number of weekly files of exchange codes and vendor codes for securities of companies around the world are processed to build master symbol database 420. The frequency of re-building master symbol database 420 will vary depending upon how quickly symbol information changes.

In step 1210, the procedure is initiated. In step 1220, the next symbol from the source file is retrieved. In step 1230, the retrieved symbol is normalized according to a set of character rules. For example, according to one embodiment in which the master symbols refer to securities of companies traded throughout the world, the following character rules are applied to each symbol from available symbol source files:

1. All special characters such as '@' and '=' are changed to '/';
2. All alphabetic characters are converted to uppercase;
3. All leading zeros from numeric symbols are removed.

In step 1240, process rules are applied. According to one embodiment of the present invention in which master symbol database 420 stores master symbols referencing securities of companies traded throughout the world, the following process rules are applied:

1. Duplicate symbols referring to the same security of the same company traded in the same country are removed;
2. Specific country rules are applied.

In step 1250, the normalized symbol is assigned a parent identifier 110. This is accomplished by determining the object corresponding to the symbol in object database 415. In step 1260, the normalized symbol 115 is stored in master symbol database 420. In step 1270, the parent identifier 110 is stored in master database 420 so that it is linked to the master symbol. In step 1280, it is determined whether all symbols in the source file have been processed. If not ('no' branch of step 880), the next symbol is examined. If so ('yes' branch of step 1280), the procedure ends.

Contributor gateway server 340a runs a number of processes to manage the receipt and archival of documents received from contributors (e.g., 340). In order to provide this functionality, contributor gateway server 340a interacts with a number of databases including contributor historical pattern database 440, normalization table database 417, document file database 450, fill text database 460 and relational database 430 as well as symbol server 410.

Figure 13:
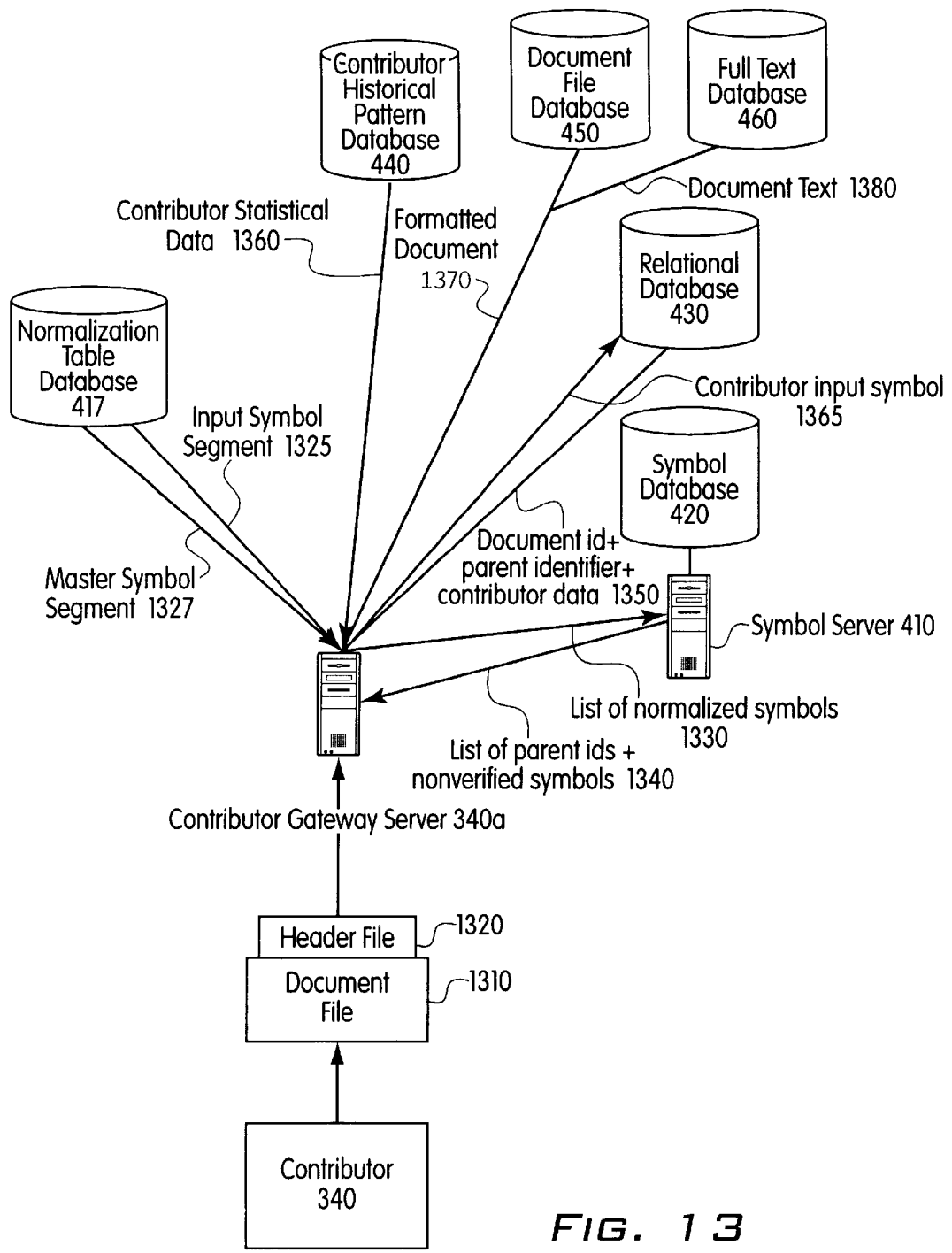
FIG. 13 is a block diagram depicting information flow between various servers and databases at document repository 319 relating to the automatic archival of documents received from a contributor according to one embodiment of the present invention.

FIG. 13 is a block diagram depicting information flow between various servers and databases at document repository 319 relating to the automatic archival of documents received from a contributor according to one embodiment of the present invention. In particular, contributor gateway server 340a runs a process to receive a document file 1310 and input symbol from a contributor. According to one embodiment of the present invention, in order to submit a document, contributor 340 may transmit a header file 1320 in a structured data format containing information about the document 1310. Header file 1320 (not shown) is composed of a number of fields including, for example, an input symbol field as well as contributor information such as the contributor's name and date of the document. Thus, contributor gateway server 340a may run an additional process to parse header file 1320 to extract information regarding particular documents submitted.

Upon extracting an input symbol from a received header file 1320, contributor gateway server 340a runs a process to normalize the input symbol according to a set of character and process rules. In conducting this process, contributor gateway server 340a may search normalization table database 417 using one or more input symbol segments 1325 to obtain normalized symbol segments 1327 from normalization table database 417 in order to resolve certain symbol segments. If symbol segments remain unresolved, contributor gateway server 340a may retrieve statistical data regarding the contributor's historical patterns 1360 from contributor historical pattern database 440 to attempt to resolve the symbol segments.

After normalization, contributor gateway server 340a transmits the normalized input symbol to symbol server 410 (1340). Symbol server 410 searches master symbol database 420 using the normalized symbol in order to retrieve a parent identifier 1340 linked to a matching master symbol in master symbol database. If symbol server 410 finds a matching master symbol in master symbol database 420, it returns the corresponding parent identifier 110. Otherwise symbol server 410 transmits a message indicating the non-verified symbol 1340. Also, the symbol server 410 searches the categorical symbol database 450 using the normalized input symbol in order to determine whether the input symbol includes a categorical symbol residing in the categorical symbol database 450. If a matching categorical symbol is found, then the contributor gateway server 340a links categorical identifying data to a unique document identifier. This categorical identifying data is used for archival and retrieval of documents based upon the categorical symbol. If the categorical symbol is not included in the input symbol, then contributor gateway server 340a may retrieve statistical data regarding the contributor's historical patterns 1360 from the contributor historical pattern database 440 in order to assign categorical identifying data to the document.

Contributor gateway server 340a then generates the unique document identifier, and stores the document identifier, parent identifier 110 and contributor data (1350) in relational database 430. If the normalized input symbol cannot be verified, contributor gateway server 340a may search relational database 430 using the contributor input symbol (1365) to determine whether the input symbol was previously linked to a parent identifier 110. Contributor gateway server 340a then stores the document so that it is linked to the document identifier (1370) in document file database 450.

Contributor gateway server 340a may also execute additional processes to negotiate between different document file formats. Thus, for example, contributor gateway server 340a may execute routines to convert a document received in a particular file format to a text format (1380) for storage in full text database 460.

Figure 14:
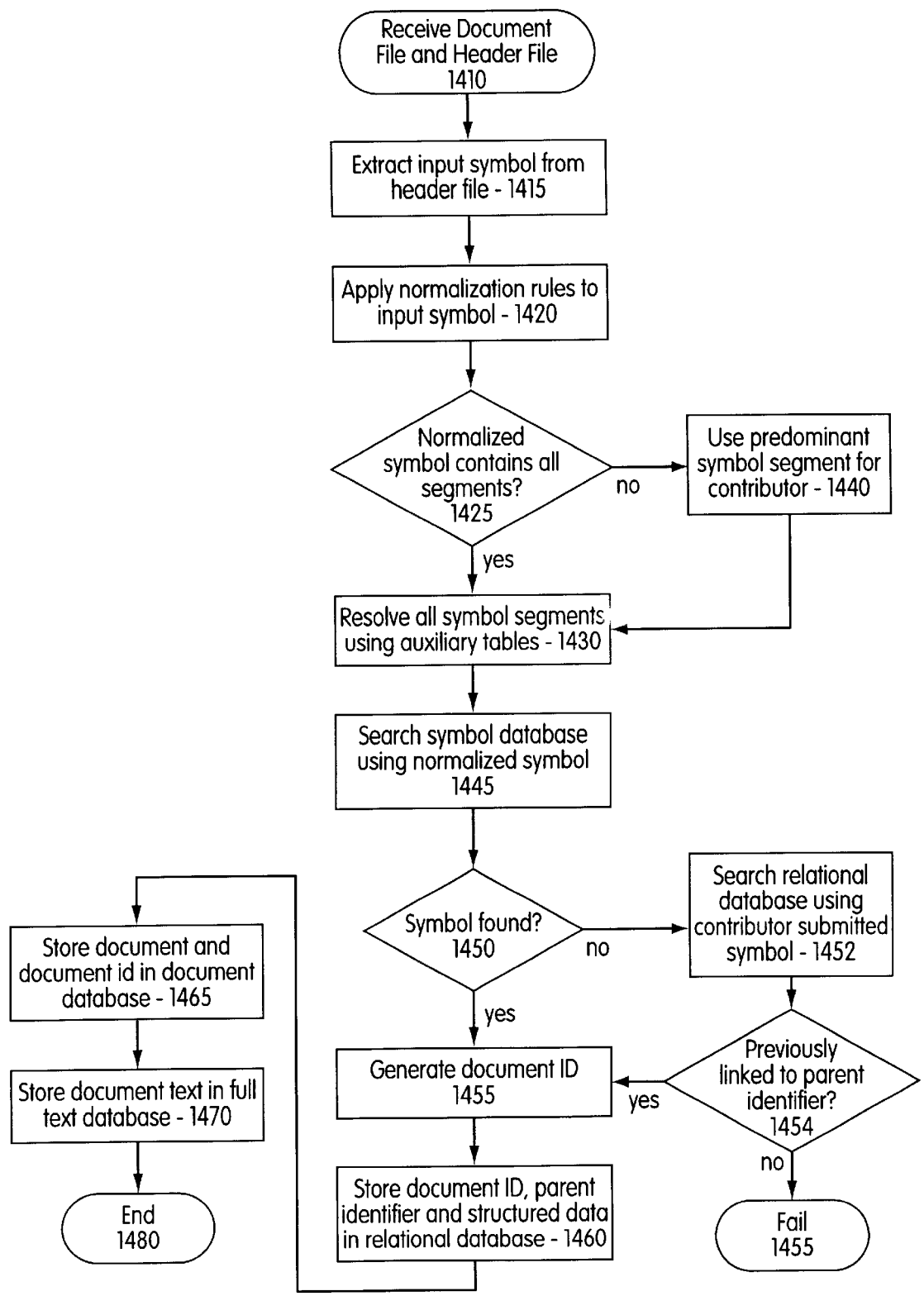
FIG. 14 is a flowchart of steps for the automatic archival of a document at a document repository according to one embodiment of the present invention.

FIG. 14 is a flowchart of steps for the automatic archival of a document at a document repository according to one embodiment of the present invention. In step 1410, a document file and header file are received at document repository 319. In step 1415, an input symbol is extracted from header file 1415. In step 1420, the input symbol is normalized according to a set of character and process rules. In step 1425, it is determined whether the input symbol contains all symbol segments. If not ('no' branch of step 1425), predominant symbol segments used by the contributor are retrieved from historical pattern database 440 (step 1440). In step 1430, normalization table database 417 is consulted to resolve certain symbol segments. In step 1445, the master symbol database 420 and categorical symbol database 425 are searched using the normalized symbol. If a matching master symbol and categorical symbol are found ('yes' branch of step 1450), a document identifier is generated (step 1455). The document identifier, parent identifier 110 and structured data from header file 1420 is then stored in relational database 430 (step 1460). In step 1465, the document and document identifier are stored in document database 450 so that the document identifier is linked to the document. In step 1470, the text of the document is stored in full text database 460. The procedure ends in step 1480.

If a matching master symbol and categorical symbol are not respectively found in the master symbol database 420 and the categorical symbol database 425, then relational database 430 is searched using the contributor submitted symbol (step 1452). If the contributor submitted symbol was previously used and linked to a parent identifier 110 ('yes' branch of step 1454), then the corresponding parent identifier 110 is used. If the contributor submitted symbol has been previously used and linked to a predominant categorical symbol segment, then the predominant categorical symbol segment is also assigned to the document. Otherwise, the procedure fails ('no' branch of step 1454). This may occur because a contributor may have submitted a document in the past using a symbol that could not be resolved. The symbol might however be resolved manually using human input. In this case, relational database 430 would store a record 705 for the document in which contributor input symbol field 750 stores the input symbol provided by the contributor that was manually resolved.

Figure 15:
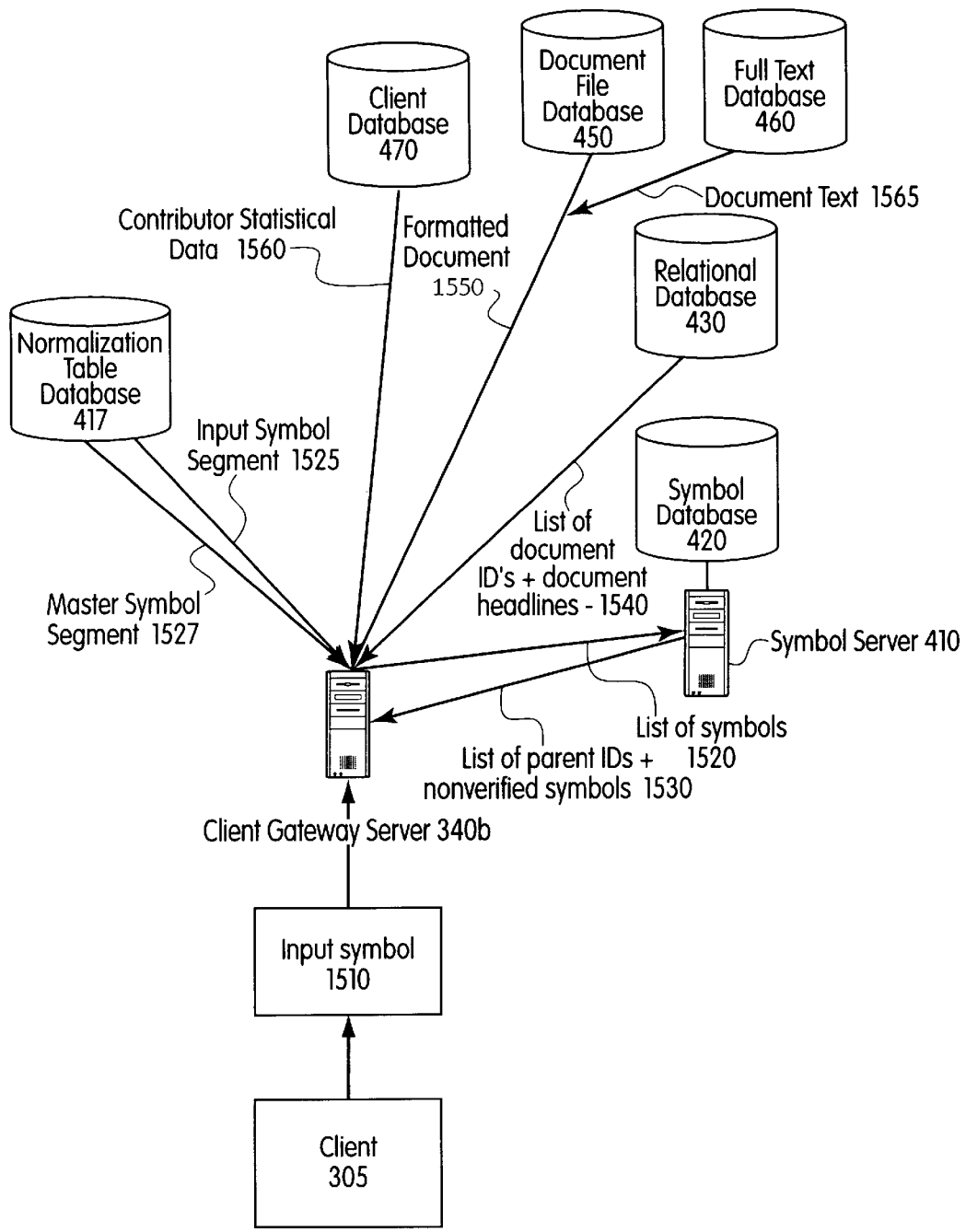
FIG. 15 is a block diagram depicting information flow between various servers and databases at document repository 319 relating to the automatic retrieval of documents based upon an input symbol provided by a client 305 according to one embodiment of the present invention.

Client gateway server 340b runs a number of processes to manage the processing of search strings and retrieval of documents requested by clients (e.g., 305). In order to provide this functionality, client gateway server 340b interacts with a number of databases including client database 470, document file database 450, full text database 460, normalization table database 417, relational database 430 as well as symbol server 410. FIG. 15 is a block diagram depicting information flow between various servers and databases at document repository 319 relating to the automatic retrieval of documents based upon an input symbol provided by a client 305 according to one embodiment of the present invention.

In particular, client gateway server 340b runs a process to provide a GUI that allows input of search requests by clients. According to one embodiment client gateway server 340b runs a CGI script that allows the input and processing of input symbols 1510 provided by clients 305 relating to particular document requests.

Client gateway server 340b runs a process to normalize input symbols 1510 provided by clients. Upon receipt of an input symbol, client gateway server 340b may retrieve information 1560 from client database 470 regarding default symbol segments if a client 305 submits an input symbol missing a particular segment. Client gateway server 340b may also submit one or more input symbol segments 1525 to search normalization table database 417 to return corresponding master symbol segments 1527.

The normalized input symbol 1520 is transmitted to symbol server 410. Symbol server 410 then uses the normalized input symbol to search master symbol database 420 to find a parent identifier linked to a matching master symbol in master symbol database 420. Using the parent identifier 110 returned from symbol server 410, client gateway server 340b searches relational database 430 to obtain a list of document identifiers and document headlines 1540 corresponding to the submitted parent identifier 110. The document headlines are processed by client gateway server 340b for display to client 305. Upon receiving selections from the clients, client gateway server 340b retrieves selected documents 1550 from document file database 450. If a client seeks documents within a particular category or associated with a categorical symbol then the symbol server 410 uses normalized input symbol 1520, which includes a categorical symbol, to search the categorical symbol database in order to find a matching categorical symbol. Symbol server 410 returns the matching categorical symbol which the client gateway server 340b receives in order to search the relational database 430 to obtain a list of document identifiers and document headlines 1540 corresponding to the submitted categorical symbol.

Figure 16:
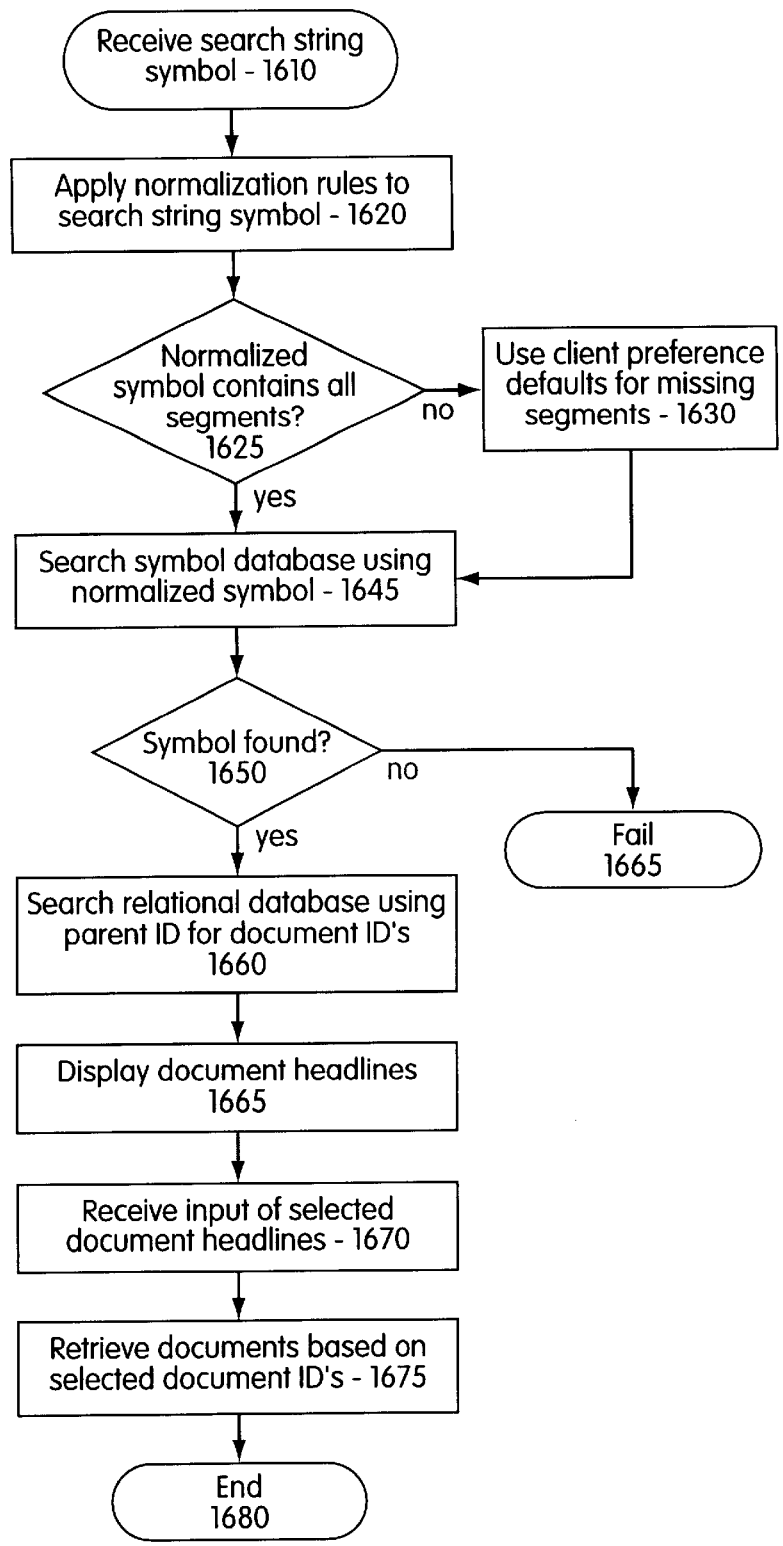
FIG. 16 is a flowchart of steps for the automatic retrieval of documents at a document repository based upon a client submitted input symbol according to one embodiment of the present invention.

FIG. 16 is a flowchart of steps for the automatic retrieval of documents at a document repository based upon a client submitted input symbol according to one embodiment of the present invention. In step 1610, an input symbol 1510 is received from client 305. In step 1620, normalization rules such as character and process rules are applied to the received input symbol 1510. In step 1625, it is determined whether the normalized symbol contains all symbol segments. If not ('no' branch of step 1625) client preference segments retrieved from client database 470 are used for the missing segments (step 1630). In step 1645, master symbol database 420 and categorical symbol database 425 are searched using the normalized symbol 115. If a matching master symbol is found in master symbol database 420 ('yes' branch of step 1650), relational database 430 is searched using the parent identifier 110 linked to the master symbol in order to generate a list of document identifiers and document headlines. If the symbol is not found ('no' branch of step 1650), the procedure fails. Alternatively, in the case of a categorical search, if a matching categorical symbol is found then the relational database 430 is searched using the categorical symbol in order to generate a list of document identifiers which are linked to the categorical symbol. In step 1665, document headlines pertaining to each found document are displayed for selection. In step 1670, client gateway server 340b accepts selection of document headlines by client 305. Based upon the selected document identifiers, the corresponding documents are retrieved from document file database 450. The procedure ends in step 1680.

Figure 17:
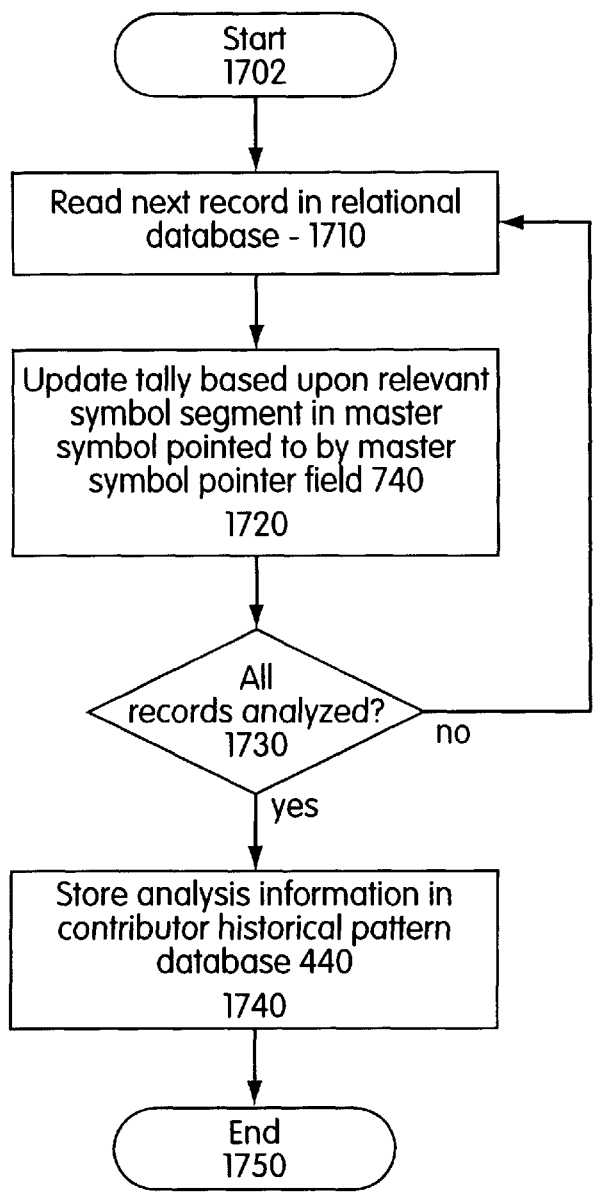
FIG. 17 is a flowchart depicting a set of steps for generating a contributor historical database according to one embodiment of the present invention.

FIG. 17 is a flowchart depicting a set of steps for generating a contributor historical database according to one embodiment of the present invention. In step 1702, the procedure is initiated. In step 1710, the next record in relational database 430 is retrieved. In step 1720, the record from relational database 430 is analyzed. In particular, master symbol pointer field 740 is used to determine a master symbol referenced in the record. The master symbol is analyzed to update a table, which tallies statistical information regarding predominantly submitted symbol segments submitted by various contributors. This table (not shown) may be implemented, for example, using a data structure such as an array. In regard to developing statistical data for categorical purposes, step 1725, the categorical symbol field 745 is used to determine a categorical symbol referenced in the record. The categorical symbol analysis updates a table and tallies statistical information regarding predominantly submitted categorical symbol segments. In step 1730, it is determined whether all records in relational database 430 have been analyzed. If not ('no' branch of step 1730), the next record in relational database 430 is analyzed. If so ('yes' branch of step 1730), the information generated in the statistical table is stored in historical pattern database 440 (step 1740). The procedure ends in step 1750.

For example, the following table might be generated after an analysis of relational database 430:

| Contributor | Symbol Field #1 | Symbol Field #2 | Symbol Field #3 |
|---|---|---|---|
| 1 | IBM 40 | GB 30 | CRes 35 |
|   | T 55 | US 50 | DerRep 10 |
|   |  | FR 15 | IdRep 50 |
| 2 | IBM 5 | GB 4 | EconRep 5 |
|   | T 2 | US 1 | CredRes 2 |
|   |  | FR 1 |  |
| 3 | IBM 450 | DE 550 | ConvRes 395 |
|   | T 275 | US 450 | CredRes 550 |
|   | QW 525 |  |  |

Thus, according to the analysis the most frequently submitted symbol segments for symbol field 1 were 'T', 'IBM' and 'QW' for contributors 1, 2 and 3 respectively. In addition, the most frequently submitted symbol segments for symbol field 2 were 'US', 'GB' and 'DE' for contributors 1, 2 and 3 respectively. Finally, the most frequently submitted symbol segments for symbol field 3 were IdRep, EconRep and ConvRes for contributors 1, 2 and 3 respectively. Thus, based upon this information, for contributor 1, contributor historical pattern database 440 would store a separate record 805 for each contributor. In particular, based upon this analysis the records would store: 'T', 'US' and 'IdRep'; 'IBM', 'GB' and EconRep; and 'QW', 'DE' and ConvRes, in predominant use segment fields 820(1), 820(2) and 820(3) for contributors 1, 2, and 3 respectively.

What is claimed is:

1. A method for storing and referencing symbolically linked information comprising the steps of:

processing a symbol in order to generate at least one of a master symbol and a categorical symbol;

determining a unique parent identifier corresponding to the master symbol;

storing the unique parent identifier and the master symbol in a master symbol database wherein the master symbol is linked to the parent identifier;

storing the categorical symbol in a categorical symbol database; and storing at least one information element wherein the at least one information element is linked to at least one of the unique parent identifier and the categorical symbol.

2. The method according to claim 1, wherein the step of processing the symbol to generate the master symbol includes the step of applying a set of character rules to the symbol.

3. The method according to claim 1, wherein the step of processing the symbol to generate the master symbol includes the step of applying a set of process rules to the symbol.

4. The method according to claim 1, wherein the at least one information element is a document.

5. The method according to claim 1, wherein each master symbol is structured according to a symbol template containing at least one symbol field.

6. The method according to claim 5, wherein each master symbol includes at least one symbol segment corresponding respectively to the at least symbol field defined by the symbol template.

7. The method according to claim 1, wherein the categorical symbol is structured according to a symbol template containing at least one symbol field.

8. The method according to claim 7, wherein the categorical symbol refers to a categorical group of information elements.

9. The method according to claim 6, wherein each master symbol refers to a security issued by a company.

10. The method according to claim 9, wherein the symbol template includes a root symbol field referring to the name of a security and a source symbol field referring to a country in which the security is traded.

11. The method according to claim 8, wherein the symbol template includes a categorical symbol field referring to a categorical symbol group.

12. The method according to claim 1, wherein the step of storing at least one information element includes the steps of generating an information element identifier, storing the information element identifier, the parent identifier and the categorical symbol so that the parent identifier and the categorical symbol are linked to the information element identifier, and storing the information element and the information element identifier so that the information element identifier is linked to the information element.

13. The method according to claim 6, wherein each symbol segment comprises an ASCII (American Standard Code for Information Interchange) string.

14. The method according to claim 12, wherein the parent identifier is linked to the information element identifier in a relational database.

15. The method according to claim 12, wherein the categorical symbol is linked to the information element identifier in a relational database.

16. A method for the archival of symbolically linked information comprising the steps of:
   receiving an information element and at least an input symbol;
   processing the input symbol to generate a normalized symbol;
   searching a master symbol database using the normalized symbol to find a matching master symbol and linked parent identifier;
   searching a categorical symbol database using the normalized symbol to find a matching categorical symbol;
   storing the information element; and
   linking at least one of the parent identifier and the categorical symbol to the information element.

17. The method according to claim 16, wherein the step of processing the input symbol to generate the normalized symbol includes the step of applying a set of character rules to the input symbol.

18. The method according to claim 16, wherein the step of processing the symbol to generate the master symbol includes the step of applying a set of process rules to the symbol.

19. The method according to claim 16, wherein the step of processing the symbol to generate the categorical symbol includes the step of applying a set of process rules to the symbol.

20. The method according to claim 16, wherein the information element is a document.

21. The method according to claim 16, wherein the master symbol database stores a set of master symbols, wherein each master symbol is structured according to a symbol template containing at least one symbol field.

22. The method according to claim 16, wherein the categorical symbol database stores a set of categorical symbols, wherein each categorical symbol is structured according to a symbol template containing at least one symbol field.

23. The method according to claim 21, wherein each master symbol includes at least one symbol segment corresponding respectively to the at least symbol field defined by the symbol template.

24. The method according to claim 23, wherein each master symbol refers to a security issued by a company.

25. The method according to claim 24, wherein the symbol template includes a root symbol field referring to the name of a security and a source symbol field referring to a country in which the security is traded.

26. The method according to claim 22, wherein the categorical symbol refers to a categorical group of information elements.

27. The method according to claim 26, wherein the symbol template includes a categorical symbol field referring to a categorical symbol group.

28. The method according to claim 16, wherein the step of storing the information element includes the steps of generating an information element identifier, storing the information element identifier, the parent identifier and the categorical symbol so that the parent identifier and the categorical symbol are linked to the information element identifier, and storing the information element and the information element identifier so that the information element identifier is linked to the information element.

29. The method according to claim 23, wherein each symbol segment comprises an ASCII (American Standard Code for Information Interchange) string.

30. The method according to claim 28, wherein the parent identifier is linked to the information element identifier in a relational database.

31. The method according to claim 28, wherein the categorical symbol is linked to the information element identifier in a relational database.

32. The method according to claim 16, further comprising the steps of:
   if the normalized symbol contains an unresolved segment, searching a contributor database to find a predominant use segment, and
   assigning the predominant use segment to the unresolved segment.

33. A method for the retrieval of symbolically linked information, comprising the steps of:
   receiving an input symbol;
   processing the input symbol to generate a normalized symbol;
   searching a master symbol database using the normalized symbol to find a matching master symbol and a parent identifier linked to the master symbol;
   searching a categorical symbol database using the normalized symbol to find a matching categorical symbol;
   searching an information element database to find an information element which is linked to at least one of the parent identifier and the categorical symbol; and
   retrieving the information element.

34. The method according to claim 33, further comprising the steps of:
  determining whether the input symbol includes an unresolved segment; and
  if the input symbol contains an unresolved segment, searching a client database to find a client preference segment, and assigning the client preference segment to the unresolved segment.

35. The method according to claim 33, wherein the step of processing the input symbol to generate the normalized symbol includes the step of applying a set of character rules to the symbol.

36. The method according to claim 33, wherein the step of processing the input symbol to generate a normalized symbol comprises applying a set of process rules to the symbol.

37. The method according to claim 33, wherein the information element is a document.

38. The method according to claim 33, wherein the master symbol database stores a set of master symbols, wherein each master symbol is structured according to a symbol template containing at least one symbol field.

39. The method according to claim 38, wherein each master symbol is structured according to a symbol template containing at least one symbol field.

40. The method according to claim 39, wherein each master symbol includes at least one symbol segment corresponding to the at least symbol field defined by the symbol template.

41. The method according to claim 40, wherein each master symbol refers to a security issued by a company.

42. The method according to claim 41, wherein the symbol template includes a root symbol field referring to the name of a security and a source symbol field referring to a country in which the security is traded.

43. The method according to claim 40, wherein each symbol segment comprises an ASCII (American Standard Code for Information Interchange) string.

44. The method according to claim 33, wherein the information database is a relational database.

45. The method according to claim 33, wherein the categorical symbol database stores a set of categorical symbols, wherein each categorical symbol is structured according to a symbol template containing at least one symbol field.

46. The method according to claim 45, wherein each categorical symbol is structured according to a symbol template containing at least one symbol field.

47. The method according to claim 46, wherein the categorical symbol refers to a categorical group of information elements.

48. The method according to claim 47, wherein the symbol template includes a categorical symbol field referring to a categorical symbol group.

49. A document repository system allowing electronic archival of documents using an input symbol comprising:
  a storage device;
  a network interface; and
  a processor coupled to the storage device, said processor adapted to:
    store master symbols in a master symbol database, wherein each master symbol is linked to a parent identifier and a document database;
    store categorical symbols in a categorical symbol database, wherein each categorical symbol is linked to a document database;
    receive an input symbol and a document via the network interface;
    process the input symbol to obtain a normalized input symbol;
    search the master symbol database using the normalized input symbol to find a matching master symbol and a linked parent identifier;
    search the categorical symbol database using the normalized input symbol to find a matching categorical symbol; and
    store the document in the document database so that the document is linked to the parent identifier and the categorical symbol.

50. The document repository system according to claim 49, wherein:
  if the input symbol contains at least one unresolved segment, for each unresolved symbol segment, the processor searches a contributor historical pattern database to find a predominant use segment, and assigns the predominant use segment to the unresolved segment.

51. A document repository system allowing electronic retrieval of documents using an input symbol, comprising:
  a storage device which includes a master symbol database which stores master symbols, a categorical symbol database which stores categorical symbols and a document database, wherein each master symbol is linked to a parent identifier, and the document database stores documents linked to a parent identifier and a categorical symbol;
  a network interface;
  a processor, which:
    receives an input symbol via the network interface,
    processes the input symbol to obtain a normalized input symbol,
    searches the master symbol database and the categorical symbol using the normalized input symbol to find a matching master symbol, a linked parent identifier and the categorical symbol, and
    retrieves documents from the document database that are linked to at least one of the following the parent identifier and the categorical symbol.

52. The document repository system according to claim 51, wherein:
  if the input symbol contains at least one unresolved segment, for each unresolved symbol segment, the processor searches a client database to find a client preference segment, and assigns the client preference segment to the unresolved segment.

* * * * *